Figure 1:
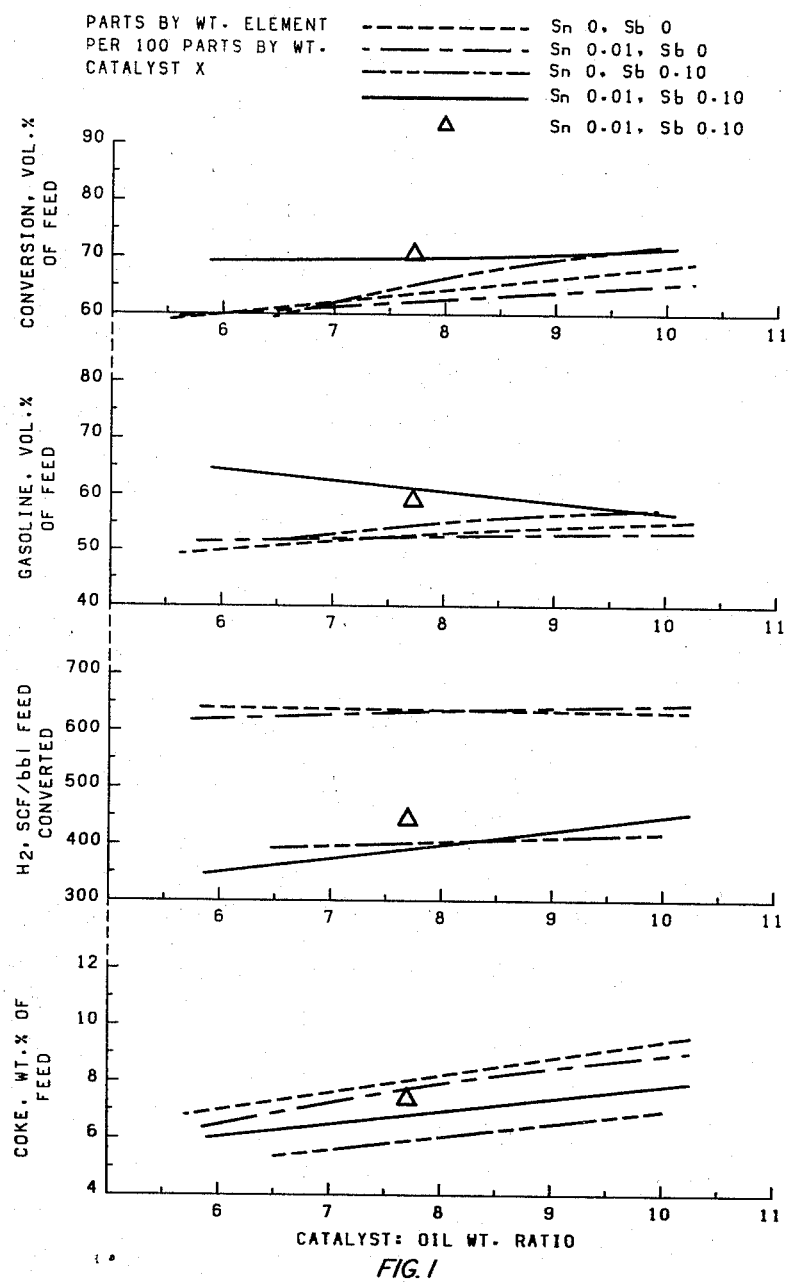
Figure 2:
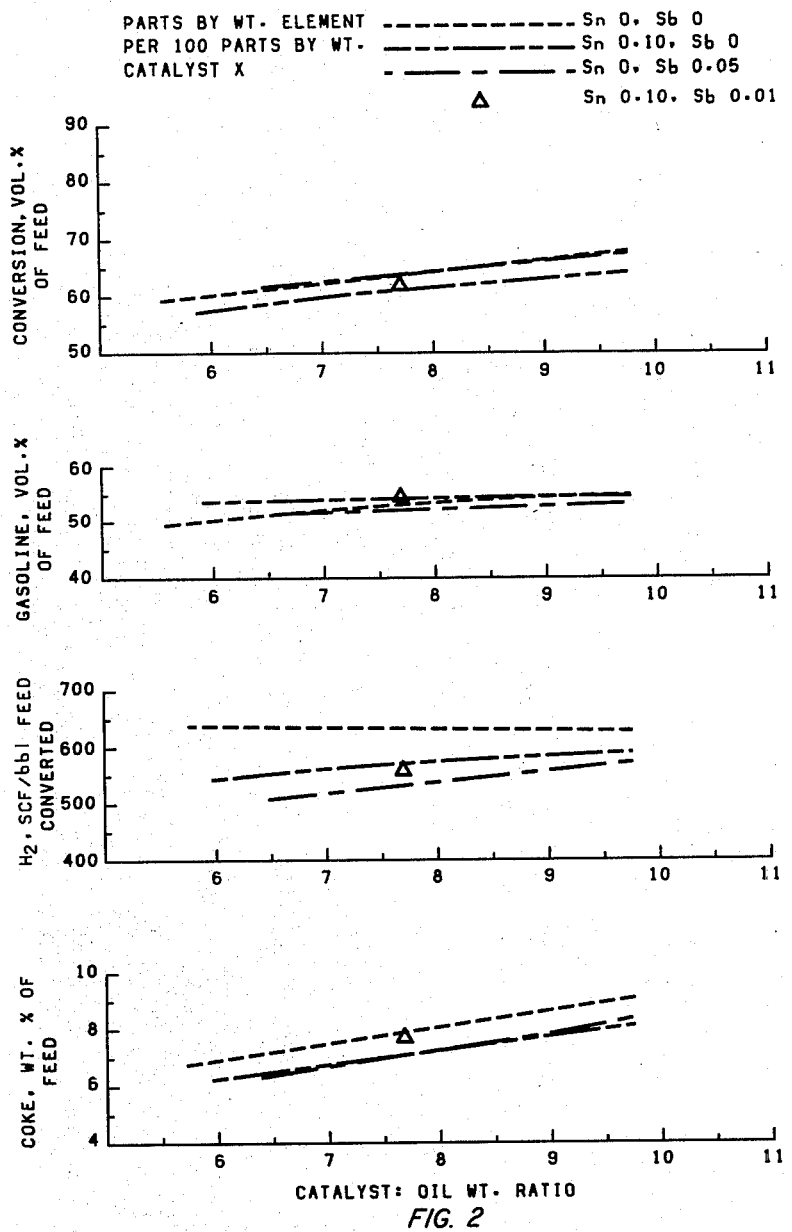
Figure 3:
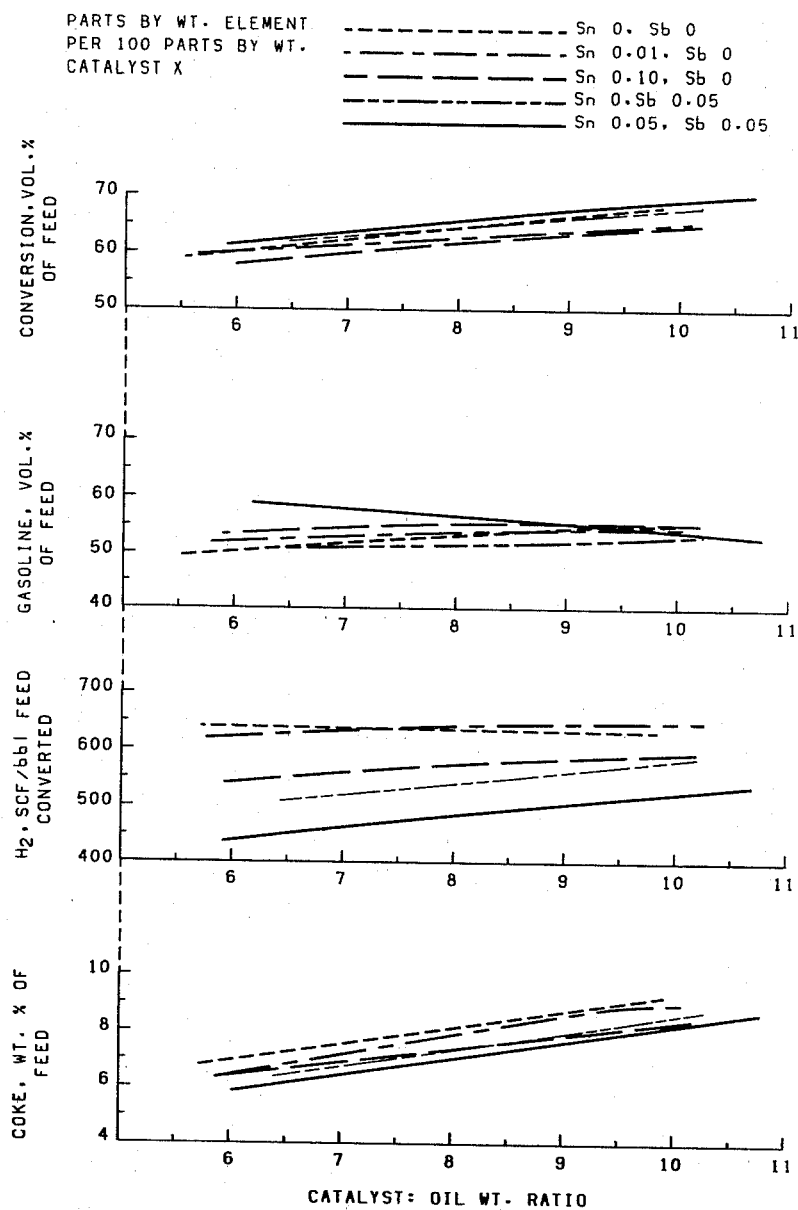
Figure 4:
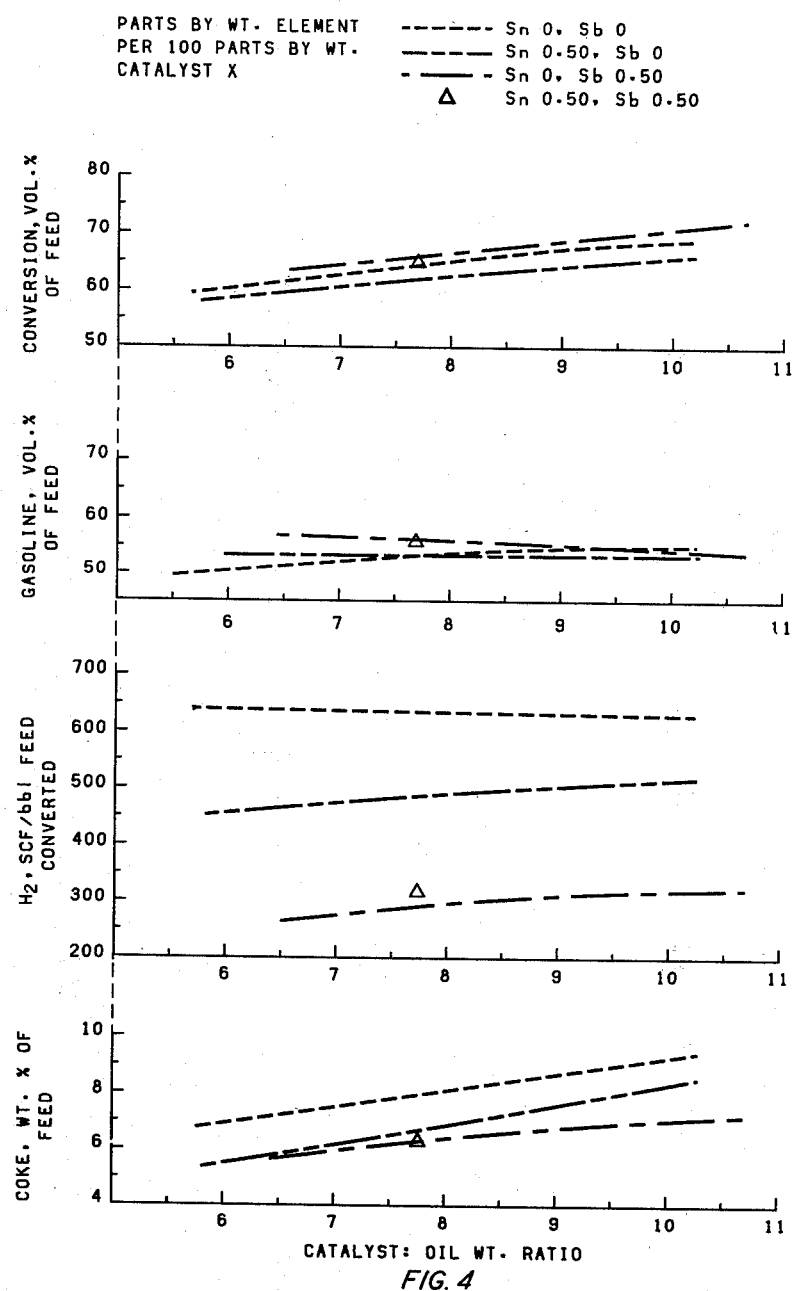

United States Patent [19]

Bertus et al.

[11] 4,321,129

[45] Mar. 23, 1982

[54] CRACKING PROCESS EMPLOYING CATALYST HAVING COMBINATION OF ANTIMONY AND TIN

[75] Inventors: Brent J. Bertus; Dwight L. McKay, both of Bartlesville, Okla.

[73] Assignee: Phillips Petroleum Company, Bartlesville, Okla.

[21] Appl. No.: 130,678

[22] Filed: Mar. 17, 1980

Related U.S. Application Data

[60] Division of Ser. No. 941,896, Sep. 12, 1978, Pat. No. 4,255,287, which is a continuation-in-part of Ser. No. 845,184, Oct. 25, 1977, abandoned.

[51] Int. Cl.$^3$ .................. C10G 11/05; C10G 11/18
[52] U.S. Cl. ........................ 208/120; 208/52 CT; 208/114; 252/437; 252/439; 252/440
[58] Field of Search ................ 208/52 CT, 113, 120

[56] References Cited

U.S. PATENT DOCUMENTS

| | | | |
|---|---|---|---|
| 2,480,494 | 8/1949 | Mathy | 208/121 |
| 3,297,565 | 1/1967 | Garwood et al. | 208/217 |
| 3,711,422 | 1/1973 | Johnson et al. | 252/414 |
| 3,994,832 | 11/1976 | Antos | 252/464 |
| 4,025,458 | 5/1977 | McKay | 252/416 |
| 4,040,945 | 8/1977 | McKinney et al. | 208/113 |
| 4,083,807 | 4/1978 | McKinney et al. | 208/120 X |
| 4,101,417 | 7/1978 | Mitchell | 208/120 |

FOREIGN PATENT DOCUMENTS

| | | |
|---|---|---|
| 866885 | 11/1978 | Belgium . |
| 2821308 | 11/1978 | Fed. Rep. of Germany . |
| 876446 | 8/1961 | United Kingdom . |

OTHER PUBLICATIONS

"Acidio Properties of Mixed Tin & Antimony Oxide Cats.", Irving and Taylor, *J. Chem. Soc., 1978,* pp. 206–210.

Chem. Abstracts, 90:139977u "(Sn and Sb in) Cat. Cracking of Hydrocarbon Oils", Perret et al. (Shell) Ger. Off. 2,821,308.

*Primary Examiner*—Delbert E. Gantz
*Assistant Examiner*—G. E. Schmitkons

[57] ABSTRACT

A novel cracking catalyst, a method of preparing same and an improved hydrocarbon cracking process are provided wherein adverse effects of metals such as nickel, vanadium, iron, copper and cobalt in the cracking catalyst are precluded or mitigated by contacting the cracking catalyst with (A) at least one of elemental antimony and compounds thereof and (B) at least one of element tin and compounds thereof whereby there is added to said catalyst a modifying amount of each of (A) and (B) with the weight ratio of antimony to tin being such as to provide passivation of the contaminating metals greater than the sum of the passivation effects of each of (A) and (B) individually. In general the ratio will be in the range of from 0.001:1 to 1000:1, and preferably will be in the range of 0.05:1 to 50:1.

76 Claims, 9 Drawing Figures

CRACKING PROCESS EMPLOYING CATALYST HAVING COMBINATION OF ANTIMONY AND TIN

This is a division of copending application Ser. No. 941,896, filed Sept. 12, 1978, now U.S. Pat. No. 4,255,287 which was a continuation-in-part of copending application Ser. No. 845,184, filed Oct. 25, 1977 (now abandoned).

Hydrocrbon feedstock containing higher molecular weight hydrocarbons is cracked by contacting it at an elevated temperature with a cracking catalyst whereby distillates such as gasoline and higher-boiling hydrocarbon fuels, e.g., kerosene, diesel fuel, burning oils and the like, are produced. However, the cracking catalyst gradually deteriorates during this process. One reason for this deterioration is the deposition of contaminating metals such as nickel vanadium, iron, copper and cobalt on the catalyst, resulting in increased production of hydrogen and coke and decreased catalyst activity for cracking. Furthermore, the conversion of hydrocarbons into gasoline and higher-boiling hydrocarbon fuels is reduced by these metals. Therefore, there is a need for a cracking process or a modified cracking catalyst which will prevent or reduce the deleterious effects of these metal contaminants.

It is thus an object of the present invention to provide an improved catalytic cracking process.

Another object of this invention is to provide a process for the passivation of contaminating metals deposited on a cracking catalyst.

Another object of this invention is to provide a process for restoration of used cracking catalyst.

Another object of this invention is to provide a modified cracking catalyst.

Another object of this invention is to provide a cracking catalyst which provides high yields and selectivity for gasoline or higher-boiling hydrocarbon fuel, e.g., kerosene, diesel fuel or burning oil.

Another object of this invention is to provide a novel passivating agent for cracking catalyst.

Other aspects, objects and the several advantages of the invention will be readily apparent to one skilled in the art from a reading of the following disclosure and the appended claims.

In the drawings FIGS. 1–9 are graphical representations of the relationships between catalyst/oil weight ratio and each of conversion, gasoline yield, hydrogen production and coke production for various catalysts, some having differing amounts of antimony and/or tin and others being without antimony and tin.

In accordance with this invention, we have vound that the adverse effects of nickel, vanadium, iron, copper and/or cobalt or other similar contaminating metals on cracking catalyst can be precluded or mitigated by contacting the cracking catalyst with (A) an amount of at least one of antimony and compounds thereof sufficient to provide at least one improvement over said cracking catalyst selected from the group consisting of an increase in catalyst activity, an increase in yield of liquid fuels, a reduction in the production of coke, and a reduction in the production of hydrogen and (B) an amount of at least one of tin and compounds thereof sufficient to provide an enhancement in said at least one improvement which is greater than the same amount of said at least one of tin and compounds thereof would provide over said cracking catalyst in the absence of antimony and/or compounds thereof. In general, the antimony component will be present in such amount as to provide at least 0.0001, more generally at least 0.005, preferably at least 0.01, and more preferably, at least 0.05, weight percent of antimony in or on the cracking catalyst, this percentage being based on the weight of cracking catalyst prior to treatment with antimony and tin or compounds thereof. Similarly the amount of antimony employed will generally be less than 8, more generally less than 2, preferably less than 1, and more preferably less than 0.8 weight percent, based on the weight of the cracking catalyst prior to treatment with antimony and tin or compounds thereof. In general, the tin component will be present in such amount as to provide at least 0.0001, more generally at least 0.0005, preferably at least 0.001, and more preferably at least 0.005, weight percent, based on the weight of the cracking catalyst prior to treatment with antimony and tin or compounds thereof. Similarly the amount of tin employed will generally be less than 8, more generally less than 2, preferably less than 1, and more preferably less than 0.8 weight percent, based on the weight of the cracking catalyst prior to treatment with antimony and tin or compounds thereof. Although any weight ratio of antimony to tin which provides the enhancement can be utilized, generally it will be within the range of about 0.001:1 to about 1000:1, more generally being within the range of about 0.01:1 to about 100:1. A weight ratio of antimony to tin in the range of 0.05:1 to 50:1 is generally preferred, with a value in the range of 2:1 to 20:1 being more preferred, and a value in the range of 5:1 to 15:1 being even more preferred.

By the addition of both antimony and tin in accordance with the present invention to the cracking catalyst either prior to, during or after its use there are achieved at least one of an increase in catalyst activity, an increase in yield of gasoline or higher-boiling hydrocarbon fuels, e.g., kerosene, diesel fuel, burning oils or the like, a decrease in the production of coke and a decrease in the production of hydrogen.

In accordance with one embodiment of this invention, a novel cracking catalyst is provided that has been prepared by contacting a conventional cracking catalyst with both antimony and tin in an amount and in a manner as herein described.

In accordance with another embodiment of this invention, there is provided a novel treating agent for cracking catalyst which consists essentially of a mixture of antimony and tin, either as the elemental metals or as compounds thereof as well as mixtures thereof, wherein the weight ratio of antimony to tin is such as to provide a passivation of contaminating metals deposited on a cracking catalyst greater than the sum of the passivation effects of each of the antimony and tin individually. In general, this ratio will be within the range of about 0.001:1 to about 1000:1, more generally in the range of about 0.01:1 to about 100:1, preferably in the range of 0.05:1 to 50:1, more preferably in the range of 2:1 to 20:1, and even more preferably in the range of 5:1 to 15:1.

The term "cracking catalyst" as used herein refers to either new or used cracking catalyst materials that are useful for cracking hydrocarbons in the absence of added hydrogen. The cracking catalyst referred to can be any conventional cracking catlyst. The term "unmodified cracking catalyst" as used herein means any cracking catalyst which has not been modified by contact with either antimony or tin.

Such cracking catalyst materials can be any of those cracking catalysts conventionally employed in the catalytic cracking of hydrocarbons boiling above 400° F. (204° C.) for the production of gasoline, motor fuel, blending components and light distillates. These conventional cracking catalysts generally contain silica or silica-alumina. Such materials are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention. Examples of cracking catalysts into or onto which antimony and tin can be incorporated include hydrocarbon cracking catalysts obtained by admixing an inorganic oxide gel with an aluminosilicate, and aluminosilicate compositions which are strongly acidic as a result of treatment with a fluid medium containing at least one rare earth metal cation and a hydrogen ion, or ion capable of conversion to a hydrogen ion. The unused catalytic cracking material employed will generally be in particulate form having a particle size principally within the range of about 10 to about 200 microns.

If desired, the cracking catalyst can contain a combustion promoter such as platinum or chromium.

The unused catalytic cracking material as employed in the present invention contains essentially no nickel, vanadium, iron, copper or cobalt. Particularly and preferably, the nickel, vanadium, iron and copper metals content of the unused catalytic cracking material which constitutes the major portion of the unused cracking catalyst of this invention is defined by the following limits:

| nickel | 0 to 0.02 weight percent |
| vanadium | 0 to 0.06 weight percent |
| iron | 0 to 0.8 weight percent |
| copper | 0 to 0.02 weight percent |

The weight percentages in this table relate to the total weight of the unused catalytic cracking material including the metals nickel, vanadium, iron and copper, but excluding the added antimony and tin modifying agents. The contents of these metals on the cracking catalyst can be determined by standard methods well known in the art, e.g., by atomic absorption spectroscopy or by X-ray fluorescence spectroscopy.

The catalytic cracking materials can vary in pore volume and surface area. Generally, however, the unused cracking catalyst will have a pore volume in the range of about 0.1 to about 1 ml/g. The surface area of this unused catalytic cracking material generally will be in the range of about 50 to about 500 m2/g.

The modified catalyst of this invention consists essentially of a conventional cracking catalyst having a modifying or passivating amount of both antimony and tin therein or thereon. The quantity of antimony and tin is generally such that about 0.0001 to about 8, more generally about 0.005 to about 2, preferably about 0.01 to about 1, and more preferably about 0.01 to about 0.8, weight percent antimony and about 0.0001 to about 8, more generally about 0.0005 to about 2, preferably about 0.001 to about 1, and more preferably about 0.001 to about 0.8, weight percent tin are deposited on the catalyst, these percentages being based on the weight of cracking catalyst prior to treatment with antimony and tin or compounds thereof. The amount of antimony and tin which is most desirable on the catalyst will vary according to the effective level of contaminating metals on the catalyst, with higher values of antimony and tin being desirable for higher effective values of contaminating metals.

The manner in which the conventional cracking catalyst is contacted with the antimony and tin modifying or treating agents is not critical. For example, the agents in finely divided form can be mixed with the conventional cracking catalyst in ordinary manner such as rolling, shaking, stirring or the like. Alternatively, the treating agents can be dissolved or dispersed in a suitable liquid, e.g., water, hydrocarbon or aqueous acid, depending in part on the particular modifying agents used, and the resulting solution or dispersion can be used to impregnate the conventional cracking catalyst, followed by volatilization of the liquid, or the modifying agents can be precipitated onto the catalyst from solutions of the treating agents in different chemical form, followed by solvent removal. If desired, the modifying agents can be dissolved or dispersed in the hydrocarbon feedstock to the cracking process, in which instance the hydrocarbon feedstock and the treating agents contact the cracking catalyst at about the same time. Also, if desired, the cracking catalyst can be exposed to the treating agents in vapor form to deposit the agents on the catalyst. Of course, combinations of the various methods can be employed to achieve modification of the catalyst with the treating agents. The modifying agents can be added to the catalyst simultaneously or sequentially. The addition of the modifying agents can be continuous or intermittent, as desired. The modifying agent can be added to the catalyst directly or via the feedstock during a first period of time and the second modifying agent can be subsequently added to the catalyst directly or via the feedstock during a second period of time.

Although the ratio of treating agents to conventional cracking catalyst can vary over a wide range, depending in part on the concentration of contaminating metals on the catalyst and in the hydrocarbon feedstock to be cracked, the treating agents generally will be used in an amount such as to provide at least about 0.0001, more generally at least about 0.005, preferably at least about 0.01, and more preferably at least about 0.05, parts by weight of antimony per 100 parts by weight conventional cracking catalyst, i.e., including any contaminating metals in the catalyst but excluding the treating agents. The treating agents will be used in an amount such as to provide generally at least about 0.0001, more generally at least about 0.0005, preferably at least about 0.001, and more preferably at least about 0.005, parts by weight tin per 100 parts by weight of such conventional cracking catalyst. Similarly the treating agents will be used in an amount such as to provide generally less than 8, more generally less than 2, preferably less than 1, and more preferably less than 0.8, parts by weight of each of antimony and tin per 100 parts by weight of such conventional cracking catalyst.

The form in which antimony is present in or on the cracking catalyst or is employed in the preparation of the antimony/tin-containing catalysts is not critical. Any antimony compound which provides passivation of contaminating metals deposited on a cracking catalyst can be utilized. Thus, elemental antimony, inorganic antimony compounds, and organic antimony compounds as well as mixtures of any two or more thereof are suitable sources of antimony. The term "antimony" generally refers to any one of these antimony sources. Examples of some inorganic antimony compounds which can be used include antimony oxides such as antimony trioxide, antimony tetroxide, and antimony pentoxide; antimony sulfides such as antimony trisulfide and antimony pentasulfide; antimony selenides such as antimony triselenide; antimony tellurides such as antimony tritelluride; antimony sulfates such as antimony trisulfate; antimonic acids such as metaantimonic acid, orthoantimonic acid and pyroantimonic acid; antimony halides such as antimony trifluoride, antimony trichloride, antimony tribromide, antimony triiodide, antimony pentafluoride and antimony pentachloride; antimonyl halides such as antimony chloride and antimonyl trichloride; antimonides such as indium antimonide; and the like. Of the inorganic antimony compounds, those which do not contain halogen are preferred. Although organic antimony compounds for use in the preparation of the antimony/tin-containing catalysts preferably contain about 3 to about 54 carbon atoms for reasons of economics and availability, organic antimony compounds outside this range are also applicable. Thus, organic polymers containing antimony can be employed as the organic antimony compound. In addition to carbon and hydrogen, the organic antimony compound can contain elements such as oxygen, sulfur, nitrogen, phosphorus or the like. Examples of some organic antimony compounds which can be used in the preparation of the antimony/tin-containing catalysts include antimony carboxylates such as antimony triformate, antimony trioctoate, antimony triacetate, antimony tridodecanoate, antimony trioctadecanoate, antimony tribenzoate, and antimony tris(cyclohexanecarboxylate); antimony thiocarboxylates such as antimony tris(thioacetate), antimony tris(dithioacetate) and antimony tris(dithiopentanoate); antimony thiocarbonates such as antimony tris(O-propyl dithiocarbonate); antimony carbonates such as antimony tris(ethyl carbonate); trihydrocarbylantimony compounds such as triphenylantimony; trihydrocarbylantimony oxides such as triphenylantimony oxide; antimony salts of phenolic compounds such as antimony triphenoxide; antimony salts of thiophenolic compounds such as antimony tris(thiophenoxide); antimony sulfonates such as antimony tris(benzenesulfonate) and antimony tris(p-toluenesulfonate); antimony carbamates such as antimony tris(diethylcarbamate); antimony thiocarbamates such as antimony tris(dipropyldithiocarbamate), antimony tris(phenyldithiocarbamate) and antimony tris(butylthiocarbamate); antimony phosphites such as antimony tris(diphenyl phosphite); antimony phosphates such as antimony tris(dipropyl phosphate); antimony thiophosphates such as antimony tris(O,O-dipropyl thiophosphate) and antimony tris(O,O-dipropyl dithiophosphate) and the like. The last compound is also known as antimony tris(O,O-dipropyl phosphorodithioate), and is the presently preferred source of antimony, due in part to its solubility in hydrocarbons and its commercial availability. Mixtures of any two or more applicable substances comprising antimony can be employed.

The form in which tin is present in or on the cracking catalyst or is emoployed in the preparation of the antimony/tin-containing catalysts is not critical. Any tin compound which promotes the passivation effects of antimony can be employed. Thus elemental tin, inorganic tin compounds and organic tin compounds as well as mixtures thereof are suitable sources of tin. The term "tin" as used herein generally refers to any one of these tin sources. Examples of some inorganic tin compounds which can be used include tin oxides such as stannous oxide and stannic oxide; tin sulfides such as stannous sulfide and stannic sulfide; tin selenides such as stannous selenide and stannic selenide; tin tellurides such as stannous telluride; tin sulfates such as stannous sulfate and stannic sulfate; stannic acids such as metastannic acid and thiostannic acid; tin halides such as stannous fluoride, stannous chloride, stannous bromide, stannous iodide, stannic fluoride, stannic chloride, stannic bromide and stannic iodide; tin phosphates such as stannic phosophate; tin oxyhalides such as stannous oxychloride and stannic oxychloride; and the like. Of the inorganic tin compounds those which do not contain halogen or silicon are preferred as the source of tin. Although organic tin compounds for use in the preparation of the antimony/tin-containing catalysts preferably contain about 2 to about 48 carbon atoms for reasons of economics and availability, organic tin compounds outside this range also are applicable. Thus organic polymers containing tin can be employed as the organic tin compound. In addition to carbon and hydrogen, the organic tin compound can contain elements such as oxygen, sulfur, nitrogen, phosphorus or the like. Examples of some organic tin compounds which can be used in the preparation of the antimony/tin-containing catalysts include tin carboxylates such as stannous formate, stannous acetate, stannous butyrate, stannous octoate, stannous decanoate, stannous oxalate, stannous benzoate, and stannous cyclohexanecarboxylate; tin thiocarboxylates such as stannous thioacetate and stannous dithioacetate; dihydrocarbyltin bis(hydrocarbyl mercaptoalkanoate)s such as dibutyltin bis(isooctyl mercaptoacetate) and dipropyltin bis(butyl mercaptoacetate); tin thiocarbonates such as stannous O-ethyl dithiocarbonate; tin carbonates such as stannous propyl carbonate; tetrahydrocarbyltin compounds such as tetrabutyltin, tetraoctyltin, tetradodecyltin, and tetraphenyltin; dihydrocarbyltin oxides such as dipropyltin oxide, dibutyltin oxide, dioctyltin oxide, and diphenyltin oxide; dihyrocarbyltin bis(hydrocarbyl mercaptide)s such as dibutyltin bis(dodecyl mercaptide) tin salts of phenolic compounds such as stannous thiophenoxide; tin sulfonates such as stannous benzenesulfonate and stannous p-toluenesulfonate; tin carbamates such as stannous diethylcarbamate; tin thiocarbamates such as stannous propylthiocarbamate and stannous diethyldithiocarbamate; tin phosphites such as stannous diphenyl phosphite; tin phosphates such as stannous dipropyl phosphate; tin thiophosphates such as stannous O,O-dipropyl thiophosphate, stannous O,O-dipropyl dithiophosphate and stannic O,O-dipropyl dithiophosphate; dihydrocarbyltin bis(O,O-dihydrocarbyl thiophosphate)s such as dibutyltin bis(O,O-dipropyl dithiophosphate); and the like. Mixtures of any two or more applicable substances comprising tin can be employed. Dibutyltin bis(isooctyl mercaptoacetate) and stannic O,O-dipropyl dithiophosphate are the tin-containing substances presently preferred, due in part to their solubility in hydrocarbons and their compatibility with antimony tris(O,O-dipropyl dithiophosphate). As a further advantage, the dibutyltin bis(isooctyl mercaptoacetate) is commercially available.

Since the main purpose of the antimony and tin on the catalytic cracking material is to prevent or mitigate the otherwise (without the antimony and tin) occurring undesirable effects of contaminating metals, in particular, the increased hydrogen and coke production and the reduced yields of gasoline or higher-boiling hydrocarbon fuels such as kerosene, diesel fuel, and burning oils caused by these contaminating metals, the sources of antimony and tin utilized and incorporated into or onto the cracking catalyst should be essentially free of such contaminating metals. The antimony and tin sources thus should essentially contain no nickel, no vanadium, no iron, no copper and no cobalt or other detrimental contaminating metal.

The antimony/tin-containing catalyst can be prepared by contacting the conventional catalytic cracking material with an admixture comprising an antimony treating agent and a tin treating agent, or the conventional cracking catalyst can be contacted with the antimony treating agent and the tin treating agent individually, in separate steps, with or without an intermediate step such as heating or diluent removal. Thus, the conventional cracking catalyst can be contacted with both treating agents at the same time or first with either treating agent and then with the other. Prior to or during use in the cracking process the antimony/tin-containing catalyst is heated to an elevated temperature, e.g., within the range of about 800° F. (427° C.) to about 1500° F. (816° C.), in an oxidizing or reducing atmosphere. Such heating can occur in the catalytic cracker, in the catalyst regenerator, or in a vessel separate from the catalytic cracker or catalyst regenerator. Thus, the antimony/tin-containing catalyst can be prepared from used or, preferably, new conventional cracking catalyst by admixing this conventional catalyst with the antimony treating agent and the tin treating agent, separately or as a mixture, in the presence or absence of a diluent, with removal of the diluent, if employed, with or without heating to an elevated temperature, and the resulting catalyst can be added as make-up catalyst for the cracking process, this make-up catalyst preferably being added to the catalyst regenerator. In a preferred process the antimony treating agent and the tin treating agent, in admixture or preferably separately, as such or preferably dissolved or dispersed in a suitable liquid, are added to the oil feedstock as the feedstock is charged to the catalytic cracker, the treating agents being added at such a rate as to maintain the concentration of antimony in or on the catalyst generally within the range of about 0.0001 to about 8, more generally in the range of about 0.005 to about 2, preferably in the range of about 0.01 to about 1, and more preferably in the range of about 0.01 to 0.8, weight percent, these percentages being based on the weight of cracking catalyst prior to treatment with the antimony and tin or compounds thereof. Similarly the treating agents are added at such a rate as to maintain the concentration of tin in or on the catalyst generally within the range of about 0.0001 to about 8, more generally in the range of about 0.0005 to about 2, preferably in the range of about 0.001 to about 1, and more preferably in the range of about 0.001 to about 0.8, weight percent, on the same basis as with the antimony. Less preferably, the antimony and tin treating agents can be added directly to a stream of catalyst in the cracking process. It is presently desirable that the cracking catalyst be contacted with the tin source in situ in the cracking reactor system. When the tin source component is added to the cracking catalyst outside of the cracking reactor system, it is desirable for such tin treated catalyst to be employed in the cracking process within a short time period, e.g., within five days, to minimize any effects of aging of the tin on the cracking catalyst.

In accordance with a further embodiment of this invention there is provided a process for restoring used cracking catalyst by passivating contaminating metals selected from the group consisting of nickel, vanadium, iron, copper and cobalt which process comprises contacting the contaminated cracking catalyst with an antimony treating agent and a tin treating agent under elevated temperature.

The time during which the catalyst is contacted with the two treating agents is not critical. Generally the time for a batch treatment of the catalyst outside of the reaction is in the range of from 0.1 to 300 minutes. In a presently preferred embodiment, the two treating agents are continuously metered into the cracking reactor via introduction into the feedstock. If desired, one treating agent can be applied directly to the catalyst and the other treating agent can be introduced via the feedstock.

As used herein, the term "antimony treating agent" is intended to include elemental antimony or a compound thereof as described above.

Similarly, the term "tin treating agent" is intended to include elemental tin or a compound thereof as described above.

In accordance with a still further embodiment of this invention, there is provided an improved cracking process wherein hydrocarbon feedstock is contacted under cracking conditions with a modified cracking catalyst which comprises a modifying amount of both an antimony treating agent and a tin treating agent as defined above. For this embodiment, too, the preferred details concerning the modified cracking catalyst disclosed above apply. Thus, the preferred modified cracking catalyst is one that is obtained by mixing a cracking catalyst with both a tin treating agent and an antimony treating agent and subjecting the mixture to high temperature conditions. Most preferably, the initial high-temperature treatment of the cracking catalyst-treating agent mixture is carried out under reducing conditions.

Advantageously, and in accordance with a still further embodiment of this invention, the antimony/tin treating agents are added to the feedstock entering the cracking zone in which they are contacted with cracking catalyst. By this procedure the contacting of the cracking catalyst and the treating agents and the initial treatment under elevated temperatures are done under the reducing conditions prevailing in the catalytic cracker.

The cracking process in which the antimony/tin-containing cracking catalyst is employed is basically an improvement over a conventional cracking process which employs a conventional cracking catalyst alone or as modified by either antimony or tin. Although the antimony/tin-containing cracking catalyst can be employed in a catalytic cracking process employing a fixed catalyst bed, it is especially useful in a fluid catalytic cracking process.

A preferred embodiment of the cracking process of this invention utilizes a cyclic flow of catalyst from a cracking zone to a regeneration zone. In this process, a hydrocarbon feedstock containing contaminating metals such as nickel, vanadium or iron is contacted in a cracking zone under cracking conditions and in the absence of added hydrogen with an antimony/tin-containing cracking catalyst as defined above; a cracked product is obtained and recovered; the cracking catalyst is passed from the cracking zone into a regeneration zone; and in the regeneration zone the cracking catalyst is regenerated by being contacted with a free oxygen-containing gas, preferably air. The coke that has been built up during the cracking process is thereby at least partially burned off the catalyst. The regenerated cracking catalyst is reintroduced into the cracking zone.

Furthermore, it is preferred in carrying out the cracking process of this invention to replace a fraction of the total cracking catalyst with unused cracking catalyst continuously or intermittently. Generally, about 0.5 to about 6 weight percent of the total cracking catalyst is replaced daily by fresh cracking catalyst. The actual quantity of the catalyst replaced depends in part upon the nature of the feedstock used. The make-up quantity of cracking catalyst can be added at any location in the process. Preferably, however, the cracking catalyst that is make-up catalyst is introduced into the regenerator in a cyclic cracking process.

Also, it is to be understood that the used cracking catalyst coming from the cracking zone, before introduction into the regenerator, is stripped of essentially all entrained liquid or gaseous hydrocarbons. Similarly, the regenerated catalyst can be stripped of any entrained oxygen before it reenters the cracking zone. The stripping is generally done with steam.

The specific conditions in the cracking zone and in the regeneration zone are not critical and depend upon several parameters, such as the feedstock used, the catalyst used, and the results desired. Preferably and most commonly, the cracking and regeneration conditions are within the following ranges:

| Cracking Zone | |
| --- | --- |
| Temperature: | 800°–1200° F. (427°–649° C.) |
| Time: | 1–40 seconds |
| Pressure: | Subatmospheric to 3000 psig |
| Catalyst:oil ratio: | 3:1 to 30:1, by weight |

| Regeneration Zone | |
| --- | --- |
| Temperature: | 1000°–1500° F. (538°–816° C.) |
| Time: | 2–40 minutes |
| Pressure: | Subatmospheric to 3000 psig |
| Air at 60° F. (16° C.) and 1 atmosphere: | 100–250 ft$^3$/lb. coke (6.2–15.6 m$^3$/kg coke) |

The feedstocks employed in the catalytic cracking process of this invention contain metal contaminants such as nickel, vanadium, iron, copper and/or cobalt and the like. The feedstocks include those which are conventionally utilized in catalytic cracking processes to produce gasoline and light distillate fractions from heavier hydrocarbon feedstocks. The feedstocks generally have an initial boiling point above about 400° F. (204° C.) and include fluids such as gas oils, fuel oils, cycle oils, slurry oils, topped crudes, shale oils, oils from tar sands, oils from coal, mixtures of two or more of these, and the like. By "topped crude" is meant those oils which are obtained as the bottoms of a crude oil fractionator. If desired, all or a portion of the feedstock can constitute an oil from which a portion of the metal content previously has been removed, e.g., by hydrotreating or solvent extraction.

Typically the feedstock utilized in the process of this invention will contain one or more of the metals nickel, vanadium and iron within the ranges shown in the following table:

| Metal | Metal Content of Feedstocks, ppm[1] |
| --- | --- |
| Nickel | 0.02 to 100 |
| Vanadium | 0.02 to 500 |
| Iron | 0.02 to 500 |
| Total metals | 0.2 to 1100 [2] |

[1]The ppm metal content refers to the feedstock as used. As used in this table and throughout the specification, ppm means parts per million, by weight.
[2]Total metals in this table and elsewhere refers to the sum of the nickel, vanadium and iron contents in the feedstock that are effective in contaminating the catalyst; the total metals content can be determined in accordance with methods well known in the art, e.g., by atomic absorption spectroscopy.

One of the most important embodiments of this invention resides in a heavy oil cracking process. The known commercial heavy oil cracking process is capable of cracking heavy oils having a metals content of up to 80 ppm of total effective metals, i.e., metals in any form detrimental to the cracking process. Economically marginal results are obtained with oils having 40 to 80 ppm of total effective metals. In accordance with this invention, heavy oils with a total metals content of about 40 to 100 ppm and even those of about 100 to 200 ppm and above of total metals can be cracked in a cracking process in the absence of added hydrogen by utilizing the cracking catalyst defined above to yield gasoline and other fuels and fuel blending components. Thus, known heavy oils with total metal contents of from 80 to 300 ppm, that heretofore could not be directly used for fuel production and in particular for gasoline or higher-boiling hydrocarbon fuels production, in accordance with this invention can be cracked to yield gasoline and higher-boiling hydrocarbon fuels such as kerosene, diesel fuel and burning oils. Most preferably, the concentration of antimony plus tin in or on the antimony/tin-containing cracking catalyst used in the process of this invention for cracking these heavily metal-loaded oils is related to the average total effective metals content of the feedstock as shown in the following table:

| Total Effective Metals in Feedstock (ppm)[2] | Antimony + Tin Concentration in Catalyst, Weight %[1] |
| --- | --- |
| <1–40 | 0.0001–0.6 |
| 40–100 | 0.05–0.8 |
| 100–200 | 0.1–1 |
| 200–300 | 0.15–1.5 |
| 300–800 | 0.2–2 |

[1]Based on weight of catalyst prior to addition of antimony- and tin-containing modifying agents.
[2]"Total Effective Metals" as used herein means the sum of the vanadium concentration, the catalytic iron concentration, four times the nickel concentration, four times the copper concentration, and the products of the concentration of any other contaminating metals and their respective relative activity.

The invention will be still more fully understood from the following examples, which are intended to illustrate preferred embodiments of the invention but not to limit the scope thereof.

EXAMPLE I

A commercial cracking catalyst comprising amorphous silica-alumina associated with zeolitic material, which had been used in a commercial cracking unit and subsequently subjected to regeneration in the laboratory, was employed in a series of tests which demonstrated the effectiveness of antimony and tin, together, in improving a metals-contaminated used cracking catalyst. Properties of the used cracking catalyst prior to regeneration in the laboratory are shown in Table I.

TABLE I

| | |
|---|---|
| Surface area, m²/g | 74.3 |
| Pore volume, ml/g | 0.29 |
| Composition, weight % | |
| Aluminum | 21.7 |
| Silicon | 24.6 |
| Nickel | 0.38 |
| Vanadium | 0.60 |
| Iron | 0.90 |
| Cerium | 0.40 |
| Sodium | 0.39 |
| Carbon | 0.06 |

The used commercial cracking catalyst having the properties shown in Table I was then subjected to regeneration in the laboratory by heating the catalyst while fluidized with air to 1200° F. (649° C.) and maintaining it at that temperature for about 30 minutes while fluidized with air. The catalyst was then cooled to room temperature (about 25° C.) while fluidized with nitrogen, and the resulting regenerated catalyst, herein designated as catalyst O, was employed as shown below.

A portion of catalyst O was used in the preparation of a catalyst composition containing 0.5 part by weight antimony and 0.5 part by weight tin per 100 parts by weight catalyst O. This was done by dry blending 35.0 parts by weight catalyst O with 0.367 part by weight dibutyltin oxide which previously had been ground until it passed through a 325 mesh screen. The resulting blend was then mixed with a solution prepared by mixing 27 parts by weight cyclohexane and 1.61 parts by weight of a mineral oil solution containing about 80 weight percent antimony tris(O,O-dipropyl phosphorodithioate). The mixture was then dried to a fine powder by heating to 500° F. (260° C.) on a hot plate.

The above catalyst comprising antimony and tin was conditioned in the following manner. The catalyst was placed in a laboratory-sized, confined fluid bed, quartz reactor and heated from room temperature (about 25° C.) to 900° F. (482° C.) while fluidized with nitrogen, then heated from 900° F. (482° C.) to 1200° F. (649° C.) while fluidized with hydrogen. While maintained at about 1200° F. (649° C.), the catalyst was then fluidized with nitrogen for 5 minutes, followed by fluidization with air for 15 minutes. The catalyst was then aged through 10 cycles, each cycle being conducted in the following manner. The catalyst at about 900° F. (482° C.) was fluidized with nitrogen for 1 minute, then heated to about 950° F. (510° C.) during 2 minutes while fluidized with hydrogen, then maintained at about 950° F. (510° C.) for 1 minute while fluidized with nitrogen, then heated to about 1200° F. (649° C.) for 10 minutes while fluidized with air, and then cooled to about 900° F. (482° C.) during 0.5 minute while fluidized with air. After these 10 aging cycles the catalyst was cooled to room temperature (about 25° C.) while fluidized with nitrogen to provide a catalyst herein designated as catalyst AT.

A second portion of catalyst O was used in the preparation of a catalyst composition containing 0.63 part by weight tin per 100 parts by weight catalyst O. This was done by dry blending 35 parts by weight regenerated catalyst O with 0.47 part by weight dibutyltin oxide which previously had been ground until it passed through a 325 mesh screen. The blend was then conditioned aged, and finally cooled to room temperature, by the procedure shown for catalyst AT, to provide a catalyst herein designated as catalyst T.

A third portion of catalyst O was used in the preparation of a catalyst composition containing 0.5 part by weight Sb per 100 parts by weight catalyst O. This was done by mixing catalyst O with a cyclohexane-mineral oil solution of antimony tris(O,O-dipropyl phosphorodithioate) containing 0.0147 g antimony per ml solution. The cyclohexane and mineral oil were removed by heating on a hot plate, and the resulting blend was conditioned, aged, and finally cooled to room temperature, by the procedure shown for catalyst AT, to provide a catalyst herein designated as catalyst A.

Catalysts AT, T, A and O were evaluated in four series of cracking regeneration cycles using topped West Texas crude oil as the feedstock in the cracking step. Except as otherwise noted in Table III, in each cycle the cracking step was carried out at 950° F. (510° C.) and about atmospheric pressure for 0.5 minute, and the regeneration step was conducted at about 1200° F. (649° C.) and about atmospheric pressure for approximately 30 minutes using fludizing air, the reactor being purged with nitrogen before and after each cracking step.

Properties of the topped West Texas crude oil used in the cracking steps are shown in Table II.

TABLE II

| | | |
|---|---|---|
| API gravity at 60° F. (16° C.)[1] | 21.4 | |
| Distillation, °F. (°C.)[2] | | |
| IBP | 556 | (291) |
| 10% | 803 | (428) |
| 20% | 875 | (468) |
| 30% | 929 | (498) |
| 40% | 982 | (528) |
| 50% | 1031 | (555) |
| Carbon residue, Rams, wt. %[3] | 5.5 | |
| Elemental analysis | | |
| S, wt. % | 1.2 | |
| Ni, ppm | 5.24 | |
| V, ppm | 5.29 | |
| Fe, ppm | 29 | |
| Pour point, °F. (°C.)[4] | 63 | (17) |
| Kinematic viscosity, cSt[5] | | |
| at 180° F. (82° C.) | 56.5 | |
| at 210° F. (99° C.) | 32.1 | |
| Refractive index at 67° C.[6] | 1.5 | |

[1] ASTM D 287-67
[2] ASTM D 1160-61
[3] ASTM D 524-64
[4] ASTM D 97-66
[5] ASTM D 445-65
[6] ASTM D 1747-62

Cracking tests conducted with catalysts AT, T, A and O are summarized in Table III.

TABLE III

| Cracking Test[1] | Catalyst | Catalyst:Oil Wt. Ratio | Conversion, Vol. % of Feed | Yield Coke, Wt. % of Feed | H₂, SCF/bbl Feed Converted | Gasoline, Vol. % of Feed | Material Balance, Wt. % |
|---|---|---|---|---|---|---|---|
| 1 | AT | 7.5 | 79.8 | 14.3 | 401 | 68.1 | 104 |
| 2 | AT | 7.5 | 80.3 | 12.6 | 341 | 69.2 | 101 |
| 3[2] | AT | 7.6 | 68.4 | 10.1 | 350 | 57.6 | 97.7 |
| 4 | AT | 7.5 | 75.8 | 11.6 | 392 | 58.2 | 95.0 |
| 5 | AT | 8.5 | 76.9 | 11.1 | 340 | 55.8 | 92.9 |

TABLE III-continued

| Cracking Test[1] | Catalyst | Catalyst:Oil Wt. Ratio | Conversion, Vol. % of Feed | Coke, Wt. % of Feed | Yield H₂, SCF/bbl Feed Converted | Gasoline, Vol. % of Feed | Material Balance, Wt. % |
|---|---|---|---|---|---|---|---|
| 6 | AT | 9.3 | 76.1 | 12.9 | 347 | 59.2 | 96.7 |
| 7[3] | AT | 7.7 | 72.6 | 12.3 | 377 | 56.7 | 95.9 |
| 8[3] | AT | 7.4 | 74.7 | 12.5 | 334 | 61.0 | 97.4 |
| 1 | T | 7.4 | 74.5 | 14.0 | 678 | 55.0 | 96.5 |
| 2 | T | 8.6 | 81.6 | 15.5 | 673 | 55.3 | 95.0 |
| 1[4] | A | 7.6 | 73.4 | 10.9 | 371 | 59.9 | 96.1 |
| 1[5] | A | 7.4 | 75.8 | 12.1 | 330 | 63.4 | — |
| 1[6] | O | 7.7 | 74.9 | 17.6 | 895 | 54.6 | 100.7 |

[1]Cracking tests are numbered in the order in which tests were conducted for the particular catalyst.
[2]Cracking test 3 was conducted about 9 months after cracking test 2 on catalyst AT.
[3]Catalyst regeneration preceding this test was conducted at about 1300° F. (704° C.) for approximately 15 minutes instead of at about 1200° F. (649° C.) for approximately 30 minutes.
[4]Although the catalyst used in this test was employed previously in 3 cracking tests at other catalyst:oil ratios, this catalyst was substantially unchanged in performance after use in such a relatively few cracking-regeneration cycles.
[5]This test was not an actual run. The values for this test were read off of smooth curves for a constant catalyst:oil ratio of 7.4 produced from values read from smooth curves produced from data obtained from multiple runs with varying catalyst:oil ratios.
[6]Although the catalyst used in this test was employed previously in 9 cracking tests conducted at temperatures of 950°-1020° F. (510°-549° C.) at various catalyst:oil ratios, this catalyst was substantially unchanged in performance after such limited use.

As indicated in Table III, each of the cracking tests in which the catalyst used was modified with both antimony and tin showed this catalyst to perform well as a cracking catalyst in the presence of contaminating metals. However, particularly outstanding results were obtained with this catalyst in the first two cracking tests. In these two tests the extent to which the catalyst had been subjected to cracking and regeneration conditions after incorporation of antimony and tin into the catalyst was not great and was less than in the subsequent tests with this catalyst. In these first two tests with the catalyst modified with both antimony and tin the conversion of feed was higher than in any other test at comparable catalyst:oil ratio, indicating higher catalyst activity, and the yield of gasoline was much greater than in any of the other tests. In these same two tests hydrogen production and coke production were much lower than in the test employing catalyst into which neither antimony nor tin had been incorporated.

As can be seen readily from a study of Table III, of the eight cracking tests conducted with the catalyst comprising both antimony and tin, tests 3-8 provided considerably lower conversion of feed and substantially lower yield of gasoline than did tests 1 and 2 of the same series. These lower values for conversion and gasoline yield are believed to be due to deactivation of the catalyst during the nine months of shelf-aging following tests 1 and 2, possibly by interaction of tin with silicon in the catalyst.

EXAMPLE II

This calculated example is given to indicate how the invention can be operated in plant scale. In a commercial cracking unit containing 200 tons of cracking catalyst, 24,300 bbl/day of oil having an API gravity of 20.8 are cracked. In order to build up a level of 0.5 weight percent (based on untreated cracking catalyst) of each of antimony and tin on the cracking catalyst, antimony tris(O,O-dipropyl phosphorodithioate) and dibutyltin oxide are each added in a quantity of 20 ppm of antimony or tin, respectively, to the feedstock for 17 days or of 30 ppm of antimony or tin, respectively, to the feedstock for 10 days. In order to keep the antimony level and the tin level each at 0.5 weight percent, the rate of addition has to be 10 ppm of each of antimony and tin in case 8 tons of catalyst per day are withdrawn from the reactor and replaced by untreated catalyst. In case only 6 tons of catalyst per day are replaced, this addition would be sufficient to keep the antimony and tin levels of the catalyst system at 0.65 weight percent each. In absolute figures this means that 2175 pounds of a mineral oil solution of antimony tris(O,O-dipropyl phosphorodithioate), this solution having an antimony content of 11 weight percent, and 503 pounds of dibutyltin oxide have to be added, per day, to the feedstock for 10 days (1450 pounds and 335 pounds, respectively, for 17 days), and that 725 pounds of this mineral oil solution of antimony tris(O,O-dipropyl phosphorodithioate) and 168 pounds of dibutyltin oxide have to be added to the feedstock to maintain the desired level of each of antimony and tin on the catalyst at 0.5 weight percent.

EXAMPLE III

A commercial cracking catalyst comprising amorphous silica-alumina associated with zeolitic material, which had been used in a commercial cracking unit and subsequently subjected to regeneration in the laboratory, was employed in the preparation of cracking catalysts containing varying amounts of antimony, tin, or antimony and tin, the source of antimony being antimony tris(O,O-dipropyl phosphorodithioate) and the source of tin being dibutyltin oxide previously ground until it passed through a 325 mesh screen. Properties of the used cracking catalyst prior to regeneration in the laboratory were as shown in Table I in Example I. The used commercial cracking catalyst having these properties was then subjected to regeneration in the laboratory by heating the catalyst while fluidized with air to 1200° F. (649° C.) and maintaining it at that temperature for 0.5-2 hours while fluidized with air. The catalyst was then cooled to room temperature (about 25° C.) while fluidized with nitrogen, and the resulting regenerated catalyst, herein designated as catalyst X, was employed as shown below.

Portions of catalyst X were used in the preparation of catalyst compositions containing, per 100 parts by weight catalyst X, 0.05 part by weight antimony and 0.05 part by weight tin, 0.10 part by weight antimony and 0.01 part by weight tin (two preparations), 0.01 part by weight antimony and 0.10 part by weight tin, and 0.50 part by weight antimony and 0.50 part by weight tin. In each of these five preparations the calculated amount of dibutyltin oxide to provide the desired tin content was dry blended with catalyst X, after which the calculated amount of a mineral oil solution of antimony tris(O,O-dipropyl phosphorodithioate) containing 10.9 weight percent antimony, together with cyclohexane, was stirred with the resulting blend to provide the desired antimony content. The mixture was then taken to apparent dryness by heating on a hot plate.

Other portions of catalyst X were used in the preparation of catalyst compositions containing 0.01, 0.1, 0.5, and 1.0 parts by weight tin per 100 parts by weight catalyst X. In each of these four preparations the calculated amount of dibutyltin oxide to provide the desired tin content was dry blended with catalyst X, the blend was wetted with cyclohexane, and the resulting mixture was taken to apparent dryness by heating on a hot plate.

Still other portions of catalyst X were used in the preparation of catalyst compositions containing 0.05, 0.1, 0.25, 0.5, and 1.0 parts by weight antimony per 100 parts by weight catalyst X. In each of these five preparations the calculated amount of a mineral oil solution of antimony tris(O,O-dipropyl phosphorodithioate) containing 10.9 weight percent antimony, in cyclohexane, was stirred with catalyst X, and the resulting mixture was taken to apparent dryness on a hot plate.

Each of the 14 catalyst compositions above was conditioned in the following manner. The catalyst was placed in a laboratory-sized, confined fluid bed, quartz reactor and heated from room temperature (about 25° C.) to 900° F. (482° C.) while fluidized with nitrogen, then heated from 900° F. (482° C.) to 1200° F. (649° C.) while fluidized with hydrogen. While maintained at about 1200° F. (649° C.), the catalyst was then fluidized with nitrogen for 5 minutes, followed by fluidization with air for 15–20 minutes. The catalyst was then aged through 10 cycles, each cycle being conducted in the following manner. The catalyst was cooled, generally to about 900° F. (482° C.) during 0.5 minute, while fluidized with air or nitrogen, then fluidized with nitrogen while maintained at approximately 900° F. (482° C.) for about 1 minute, then heated to 1200° F. (649° C.) during 2 minutes while fluidized with nitrogen and hydrogen, then maintained at 1200° F. (649° C.) for 1 minute while fluidized with nitrogen, and then maintained at 1200° F. (649° C.) for 8–94 minutes while fluidized with air. After these 10 aging cycles the catalyst was cooled to room temperature (about 25° C.) while fluidized with nitrogen.

The 14 aged catalysts prepared as described above and catalyst X (2 samples) were evaluated in 15 series of cracking-regeneration cycles, in which the cracking step was conducted over a range of catalyst:oil ratios, using about 34–40 g of catalyst as a confined fluid bed in a quartz reactor and employing a gas oil as the feedstock in the cracking step. In each cycle the cracking step was carried out at 950° F. (510° C.) and about atmospheric pressure for 0.5 minute, and the regeneration step was conducted at 1200° F. (649° C.) and about atmospheric pressure for approximately 30 minutes using fluidizing air, the reactor being purged with nitrogen before and after each cracking step.

Properties of the gas oil used in this Example are shown in Table IV.

TABLE IV

| | | |
|---|---|---|
| API gravity at 60° F. (16° C.)[1] | 25.8 | |
| Specific gravity | 0.8996 | |
| BMCI[2] | 41.1 | |
| Distillation, °F. (°C.)[3] | | |
| 2% | 498 | (259) |
| 5% | 529 | (276) |
| 10% | 566 | (297) |
| 20% | 621 | (327) |
| 30% | 669 | (354) |
| 40% | 715 | (379) |
| 50% | 759 | (404) |
| 60% | 799 | (426) |
| 70% | 842 | (450) |
| 80% | 895 | (479) |
| 90% | 973 | (523) |
| 95% | 1047 | (564) |
| Carbon residue, Rams, wt. %[4] | 0.87 | |
| Sulfur, wt. % | 0.40 | |
| Basic nitrogen, wt. % | 0.025 | |
| Total nitrogen, wt. % | 0.07 | |

[1] ASTM D 287-67.
[2] V. A. Kalichevsky and K. A. Kobe, "Petroleum Refining with Chemicals", Elsevier Publishing Co., New York, N.Y. (1956), p. 56.
[3] ASTM D 1160-61.
[4] ASTM D 524-64.

Results of the cracking tests conducted at various catalyst:oil ratios are summarized in Table V. All cracking tests carried out with a given catalyst are included except those which gave results which obviously were in error because of equipment malfunction or human error. Specifically, tests having a material balance outside of 100±5% were omitted. Tests with a given catalyst were made in the order in which they are listed. In each instance in which the catalyst was one which had been treated with tin, with the exception of the M, N and O series, not more than 4 days elapsed between the time of preparation and conditioning of the catalyst and the time the first test was conducted, or between any two tests, including tests which were in error for the reasons noted above. In the M, N and O series, about 34 days, about 35 days, and about 22 days, respectively, elapsed between the time the catalyst was prepared and conditioned and the time the first test was conducted. FIGS. 1 through 7 show in graphical form comparisons of selected tests given in Table V, a series of at least five tests with a given catalyst composition at varying catalyst:oil ratios being curve-fitted to provide smooth curves as shown, and two or three tests with a given catalyst composition at nearly constant catalyst:oil ratios being shown as single points, each of which represents the average of the values on which it is based.

TABLE V

| Cracking Test[1] | Catalyst, Wt. % Element Added | | Catalyst:Oil Wt. Ratio | Conversion, Vol. % of Feed | Yield | | |
|---|---|---|---|---|---|---|---|
| | Sn[2] | Sb[3] | | | Coke, Wt. % of Feed | H$_2$, SCF/bbl Feed Converted | Gasoline, Vol. % of Feed |
| 1A | 0 | 0 | 6.04 | 59.0 | 7.2 | 700 | 47.3 |
| 2A | 0 | 0 | 7.87 | 66.3 | 9.2 | 674 | 54.3 |
| 3A | 0 | 0 | 9.51 | 68.3 | 9.4 | 663 | 52.0 |
| 4A | 0 | 0 | 7.00 | 61.1 | 7.1 | 616 | 51.5 |
| 5A | 0 | 0 | 8.99 | 69.1 | 9.4 | 573 | 54.6 |
| 6A | 0 | 0 | 7.07 | 61.2 | 7.5 | 626 | 53.5 |
| 7A | 0 | 0 | 9.91 | 68.9 | 9.0 | 662 | 53.4 |
| 8A | 0 | 0 | 8.02 | 62.9 | 7.5 | 671 | 56.8 |
| 9A | 0 | 0 | 8.02 | 67.0 | 8.4 | 611 | 55.2 |
| 10A | 0 | 0 | 9.02 | 64.2 | 8.2 | 668 | 55.6 |

TABLE V-continued

| Cracking Test[1] | Catalyst, Wt. % Element Added Sn[2] | Sb[3] | Catalyst:Oil Wt. Ratio | Conversion, Vol. % of Feed | Yield Coke, Wt. % of Feed | $H_2$, SCF/bbl Feed Converted | Gasoline, Vol. % of Feed |
|---|---|---|---|---|---|---|---|
| 11A | 0 | 0 | 6.00 | 59.9 | 6.7 | 617 | 51.9 |
| 1B | 0.01 | 0 | 7.71 | 64.1 | 10.3 | 765 | 49.3 |
| 2B | 0.01 | 0 | 9.04 | 67.2 | 10.8 | 800 | 56.1 |
| 3B | 0.01 | 0 | 9.07 | 70.6 | 10.1 | 726 | 61.3 |
| 4B | 0.01 | 0 | 6.50 | 60.6 | 7.7 | 636 | 50.8 |
| 5B | 0.01 | 0 | 9.99 | 67.0 | 9.7 | 684 | 55.4 |
| 6B | 0.01 | 0 | 8.07 | 62.6 | 8.3 | 611 | 55.9 |
| 7B | 0.01 | 0 | 6.99 | 61.6 | 6.9 | 589 | 54.9 |
| 8B | 0.01 | 0 | 6.03 | 59.8 | 5.6 | 555 | 53.1 |
| 9B | 0.01 | 0 | 9.99 | 62.4 | 8.2 | 687 | 54.9 |
| 10B | 0.01 | 0 | 10.17 | 67.8 | 9.4 | 613 | 50.8 |
| 1C | 0.10 | 0 | 7.06 | 60.8 | 7.4 | 569 | 53.5 |
| 2C | 0.10 | 0 | 7.96 | 61.7 | 6.8 | 587 | 57.3 |
| 3C | 0.10 | 0 | 5.94 | 56.8 | 6.2 | 540 | 51.5 |
| 4C | 0.10 | 0 | 9.99 | 62.3 | 8.3 | 618 | 50.9 |
| 5C | 0.10 | 0 | 9.09 | 65.4 | 7.8 | 562 | 54.4 |
| 1D | 0.50 | 0 | 6.94 | 61.3 | 6.3 | 481 | 52.9 |
| 2D | 0.50 | 0 | 7.94 | 62.7 | 6.9 | 474 | 56.3 |
| 3D | 0.50 | 0 | 9.09 | 65.0 | 7.5 | 536 | 53.5 |
| 4D | 0.50 | 0 | 9.98 | 64.2 | 8.3 | 495 | 53.3 |
| 5D | 0.50 | 0 | 6.02 | 57.8 | 5.4 | 452 | 53.9 |
| 1E | 1.00 | 0 | 7.01 | 56.7 | 6.3 | 540 | 53.4 |
| 2E | 1.00 | 0 | 10.06 | 63.5 | 7.7 | 530 | 54.4 |
| 3E | 1.00 | 0 | 9.05 | 63.5 | 7.1 | 504 | 55.5 |
| 4E | 1.00 | 0 | 8.09 | 62.6 | 6.9 | 533 | 54.8 |
| 5E | 1.00 | 0 | 10.64 | 71.0 | 8.1 | 540 | 55.2 |
| 1F | 0 | 0.05 | 9.91 | 66.0 | 9.2 | 608 | 54.7 |
| 2F | 0 | 0.05 | 9.07 | 67.0 | 5.6 | 563 | 51.9 |
| 3F | 0 | 0.05 | 6.54 | 61.3 | 7.1 | 537 | 52.5 |
| 4F | 0 | 0.05 | 7.75 | 62.6 | 6.3 | 514 | 51.0 |
| 5F | 0 | 0.05 | 8.63 | 67.6 | 7.6 | 522 | 51.7 |
| 1G | 0 | 0.10 | 7.61 | 64.4 | 6.2 | 432 | 52.4 |
| 2G | 0 | 0.10 | 10.04 | 69.8 | 7.1 | 416 | 57.2 |
| 3G | 0 | 0.10 | 9.02 | 72.0 | 6.2 | 411 | 57.2 |
| 4G | 0 | 0.10 | 8.33 | 66.5 | 6.4 | 422 | 58.1 |
| 5G | 0 | 0.10 | 6.53 | 59.3 | 5.3 | 385 | 52.7 |
| 1H | 0 | 0.25 | 7.76 | 64.3 | 6.4 | 338 | 55.3 |
| 2H | 0 | 0.25 | 10.06 | 67.4 | 6.7 | 348 | 56.4 |
| 3H | 0 | 0.25 | 11.04 | 70.9 | 7.9 | 336 | 52.6 |
| 4H | 0 | 0.25 | 9.00 | 66.3 | 6.6 | 335 | 55.0 |
| 5H | 0 | 0.25 | 6.50 | 60.6 | 5.1 | 293 | 53.8 |
| 1I | 0 | 0.50 | 10.70 | 74.8 | 6.9 | 307 | 57.2 |
| 2I | 0 | 0.50 | 6.44 | 66.5 | 5.8 | 269 | 59.7 |
| 3I | 0 | 0.50 | 8.50 | 66.4 | 6.9 | 307 | 55.8 |
| 4I | 0 | 0.50 | 9.49 | 68.7 | 6.9 | 341 | 52.9 |
| 5I | 0 | 0.50 | 7.63 | 62.7 | 6.1 | 286 | 54.1 |
| 1J | 0 | 1.00 | 7.72 | 61.0 | 9.1 | 376 | 51.2 |
| 2J | 0 | 1.00 | 6.49 | 59.2 | 5.0 | 395 | 48.2 |
| 3J | 0 | 1.00 | 8.61 | 60.5 | 6.6 | 491 | 49.1 |
| 4J | 0 | 1.00 | 9.53 | 65.1 | 6.9 | 440 | 49.3 |
| 5J | 0 | 1.00 | 10.50 | 68.5 | 7.4 | 431 | 46.9 |
| 6J | 0 | 1.00 | 7.71 | 58.3 | 6.5 | 432 | 47.3 |
| 7J | 0 | 1.00 | 9.03 | 62.5 | 7.1 | 456 | 50.0 |
| 1K | 0.05 | 0.05 | 7.74 | 59.1 | 6.9 | 565 | 52.9 |
| 2K | 0.05 | 0.05 | 9.98 | 65.5 | 8.1 | 571 | 50.9 |
| 3K | 0.05 | 0.05 | 10.51 | 68.6 | 8.9 | 524 | 52.0 |
| 4K | 0.05 | 0.05 | 8.53 | 69.0 | 8.0 | 485 | 57.0 |
| 5K | 0.05 | 0.05 | 9.37 | 75.1 | 8.3 | 494 | 61.2 |
| 6K | 0.05 | 0.05 | 6.56 | 61.9 | 6.5 | 472 | 54.9 |
| 7K | 0.05 | 0.05 | 10.01 | 65.4 | 7.9 | 545 | 57.2 |
| 8K | 0.05 | 0.05 | 9.86 | 69.5 | 7.9 | 486 | 52.8 |
| 9K | 0.05 | 0.05 | 8.97 | 69.8 | 7.5 | 479 | 58.8 |
| 10K | 0.05 | 0.05 | 7.70 | 60.9 | 7.2 | 494 | 56.0 |
| 11K | 0.05 | 0.05 | 6.54 | 65.2 | 6.1 | 430 | 59.3 |
| 12K | 0.05 | 0.05 | 7.50 | 66.9 | 6.2 | 428 | 62.9 |
| 1L | 0.01 | 0.10 | 10.08 | 69.5 | 7.8 | 474 | 55.9 |
| 2L | 0.01 | 0.10 | 9.10 | 68.5 | 7.4 | 447 | 56.4 |
| 3L | 0.01 | 0.10 | 6.44 | 68.8 | 5.8 | 356 | 62.3 |
| 4L | 0.01 | 0.10 | 7.65 | 70.7 | 6.2 | 376 | 63.6 |
| 5L | 0.01 | 0.10 | 8.50 | 74.6 | 7.3 | 347 | 63.4 |
| 6L | 0.01 | 0.10 | 5.89 | 67.5 | 6.2 | 377 | 63.6 |
| 1M | 0.01 | 0.10 | 7.71 | 70.5 | 7.2 | 444 | 59.5 |
| 2M | 0.01 | 0.10 | 7.70 | 70.9 | 7.7 | 449 | 58.8 |
| 1N | 0.10 | 0.01 | 7.72 | 60.4 | 7.5 | 548 | 52.8 |
| 2N | 0.10 | 0.01 | 7.70 | 65.9 | 8.3 | 566 | 56.3 |
| 3N | 0.10 | 0.01 | 7.73 | 65.4 | 8.3 | 567 | 55.5 |
| 1O | 0.50 | 0.50 | 7.75 | 66.8 | 6.3 | 305 | 58.2 |
| 2O | 0.50 | 0.50 | 7.68 | 63.0 | 6.0 | 338 | 53.5 |

TABLE V-continued

| Cracking Test[1] | Catalyst, Wt. % Element Added Sn[2] | Catalyst, Wt. % Element Added Sb[3] | Catalyst:Oil Wt. Ratio | Conversion, Vol. % of Feed | Yield Coke, Wt. % of Feed | Yield $H_2$, SCF/bbl Feed Converted | Yield Gasoline, Vol. % of Feed |
|---|---|---|---|---|---|---|---|
| 3O | 0.50 | 0.50 | 7.74 | 65.5 | 6.9 | 320 | 56.4 |

[1]Tests 1A through 5A were conducted with one catalyst sample, and tests 6A through 11A were carried out with another catalyst sample.
[2]Based on weight of catalyst prior to addition of tin as dibutyltin oxide and prior to addition of antimony, if any.
[3]Based on weight of catalyst prior to addition of antimony as antimony tris(O,O-dipropyl phosphorodithioate) and prior to addition of tin, if any.

Figure 5:
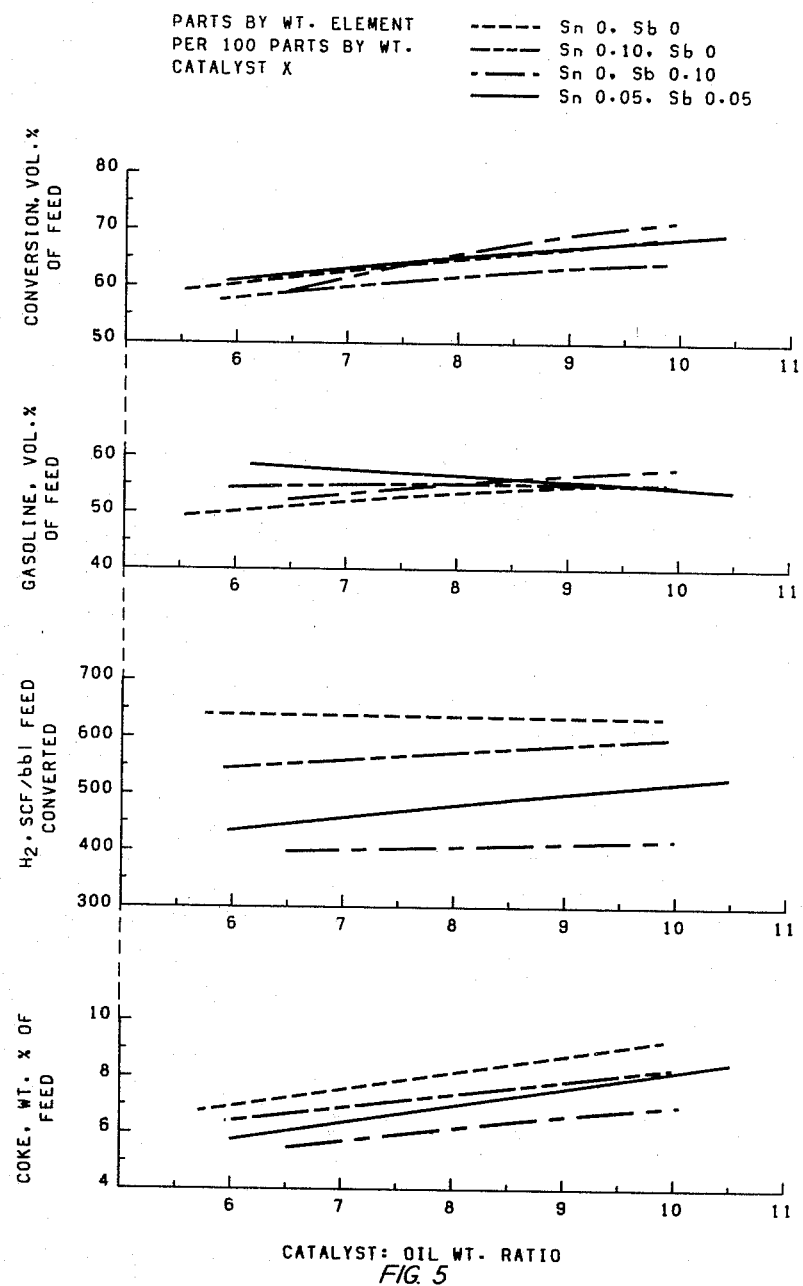
Figure 6:
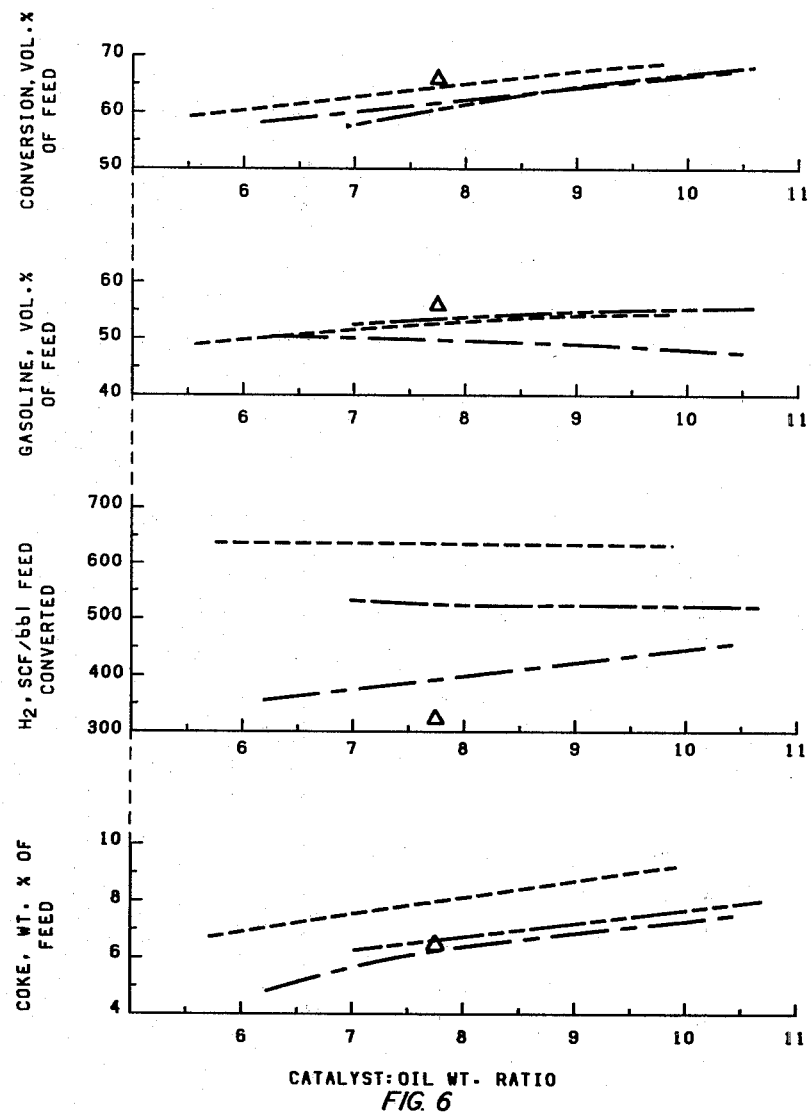
Figure 7:
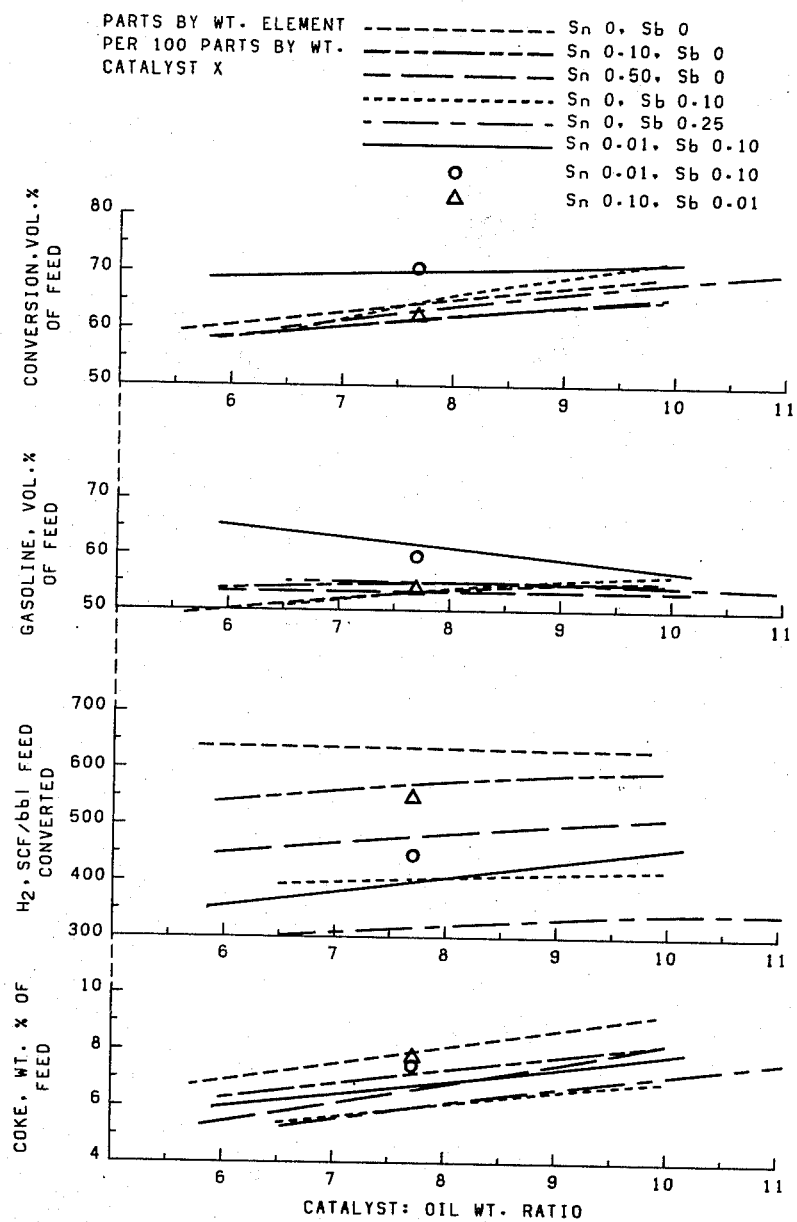

As can be seen by an analysis of the results shown in FIGS. 1 through 7, the advantages of using tin and antimony, in combination, as constituents of a cracking catalyst vary considerably, depending, for example, on the concentrations of tin and antimony, the ratio of tin to antimony, and the catalyst:oil ratio. FIG. 1 depicts most clearly the unexpectedly good conversion of feed throughout a range of catalyst:oil weight ratios of less than 6 to about 10 when a catalyst comprising both tin and antimony was used. Not only is the positive improvement in conversion contributed by the combination of antimony and tin greater than the algebraic sum of the positive contribution of antimony and the negative contribution of tin throughout the catalyst:oil weight ratio range of 6 to 10, the combination provides a definite enhancement of the positive contribution of antimony throughout the range of about 6 to about 9 for the catalyst:oil weight ratio. FIGS. 1 and 5 show best the surprisingly good yields of gasoline obtained at catalyst:oil weight ratios such as from about 6 to about 9.5 in FIG. 1 and from about 6 to about 8.4 in FIG. 5, when catalysts containing both tin and antimony were employed. FIG. 6 shows clearly the unexpectedly low production of hydrogen at a catalyst:oil weight ratio of about 7.7 when a catalyst containing both tin and antimony was used.

To further illustrate the advantages of having both tin and antimony in a cracking catalyst, shown in Table VI are conversion and yield results at a catalyst:oil weight ratio of 7.7:1, the values having been determined graphically from the appropriate curves in FIGS. 1 through 7, with the exception of cracking tests 13, 14 and 15, the values for which represent averages of the appropriate values shown for the M, N, and O series of tests, respectively, shown in Table V. Thus each of the cracking tests shown in Table VI is not an individual test which was actually carried out but instead is based on a series of tests which were conducted.

TABLE VI

| Cracking Test | Catalyst, Wt. % Element Added Sn[1] | Catalyst, Wt. % Element Added Sb[2] | Conversion, Vol. % of Feed | Yield Coke, Wt. % of Feed | Yield $H_2$, SCF/bbl Feed Converted | Yield Gasoline, Vol. % of Feed |
|---|---|---|---|---|---|---|
| 1  | 0    | 0    | 64   | 8.0 | 640 | 53.3 |
| 2  | 0.01 | 0    | 62   | 7.8 | 638 | 52.7 |
| 3  | 0.1  | 0    | 61.4 | 7.2 | 578 | 54.1 |
| 4  | 0.5  | 0    | 62   | 6.6 | 480 | 54.6 |
| 5  | 1.0  | 0    | 60.1 | 6.6 | 530 | 53.9 |
| 6  | 0    | 0.05 | 64   | 6.1 | 530 | 52.5 |
| 7  | 0    | 0.1  | 64.8 | 6.0 | 410 | 55.0 |
| 8  | 0    | 0.25 | 63.8 | 5.9 | 320 | 55.1 |
| 9  | 0    | 0.5  | 66   | 6.3 | 295 | 56.1 |
| 10 | 0    | 1.0  | 61   | 6.8 | 390 | 50.0 |
| 11 | 0.05 | 0.05 | 64.2 | 6.9 | 475 | 56.8 |
| 12 | 0.01 | 0.10 | 69.8 | 6.6 | 385 | 61.1 |
| 13 | 0.01 | 0.10 | 70.7 | 7.5 | 446 | 59.1 |
| 14 | 0.10 | 0.01 | 65.5 | 8.3 | 565 | 56.5 |
| 15 | 0.50 | 0.50 | 65.1 | 6.4 | 320 | 56.0 |

[1]Based on weight of catalyst prior to addition of tin as dibutyltin oxide.
[2]Based on weight of catalyst prior to addition of antimony as antimony tris(O,O-dipropyl phosphorodithioate) and prior to addition of tin, if any.

As shown in Table VI, the feed conversions and usually the gasoline yields are surprisingly high in cracking tests 11 through 15 employing catalysts within the scope of this invention when compared with the feed conversions and gasoline yields in cracking tests 1 through 10 conducted with catalysts outside the scope of this invention. For example, the feed conversion and gasoline yield in each of tests 12 and 13 are far higher than would be predicted on the basis of changes in these characteristics, based on results in control test 1 where neither antimony nor tin is present, in test 2 where tin is present in the absence of antimony, and in test 7 where antimony is present in the absence of tin, if such changes are additive. Thus, based on the results of tests 1, 2, and 7, the feed conversion in tests 12 and 13 would be predicted to be 64+(62-64)+(64.8-64)=62.8 volume percent, and the gasoline yield in tests 12 and 13 would be predicted to be 53.3+(52.7-53.3)+(55.0-53.3)=54.4 volume percent of the feed. Each of these predicted values is decidedly inferior to the values for the corresponding characteristics as shown for tests 12 and 13. On a similar basis, the feed conversion and gasoline yield in test 14 are surprisingly high when compared with these characteristics for catalysts in tests 1, 3, and 6, interpolation being used to estimate the values for a catalyst having the antimony content of the catalyst in test 14 but containing no tin. Also, on a similar basis, the feed conversion and gasoline yield in test 11 are higher than would be predicted upon consideration of the values in tests 1, 2, 3, and 6, with the aid of interpolation, and the feed conversion in test 15 is higher than would be predicted upon consideration of the values in tests 1, 4, and 9. Furthermore, the feed conversion and gasoline yield obtained with the catalyst in test 11 are higher than the average of the values for the corresponding characteristic as determined in tests 3 and 7, in which the catalyst contains antimony or tin, in the absence of the other, in a concentration equal to the sum of the concentrations of antimony and tin in the catalyst in test 11. Actually, the gasoline yield in test 11 is higher than that in either of tests 3 and 7. Similarly, the feed conversion and gasoline yield obtained with the catalyst in test 15 are higher than the average of the values for the corresponding characteristic as shown for tests 5 and 10 and, in fact, are higher than either of the values for the corresponding characteristic as shown for tests 5 and 10. Also, similarly, the feed conversions and gasoline yields obtained with the catalysts in tests 12, 13, and 14 are higher than either value, as well as higher than the average of the values, for the corresponding characteristic for a catalyst containing antimony or tin, in the absence of the other, in a concentration equal to the sum of the concentrations of antimony and tin in the catalyst shown for any one of tests 12, 13, and 14, the values for the catalysts containing antimony or tin, in the absence of the other, being obtained by interpolation between values shown for tests 3 and 4 and between values shown for tests 7 and 8.

A comparison of test 12, in which a catalyst was used which has undergone no prolonged shelf-aging, with test 13, in which a like catalyst was utilized which has stood for about 34 days after it was prepared and conditioned before it was used in a cracking test, indicates that although the catalyst used in each of the two tests is very good, the overall effect of prolonged shelf-aging is deleterious. Thus, although the feed conversion in test 13 is better than in test 12, in test 13 the coke and hydrogen produced are greater than in test 12 and the gasoline yield is lower.

EXAMPLE IV

A commercial cracking catalyst comprising amorphous silica-alumina associated with zeolitic material, which had been used in a commercial cracking unit and subsequently subjected to regeneration in the laboratory, was employed in the preparation of cracking catalysts containing varying amounts of antimony, tin, or antimony and tin, the source of antimony being antimony tris(O,O-dipropyl phosphorodithioate) and the source of tin being dibutyltin bis(isooctyl mercaptoacetate). This compound has the formula: (n-$C_4H_9$)$_2$Sn(SCH$_2$CO$_2$C$_8$H$_{17}$-iso)$_2$. Properties of the used cracking catalyst prior to regeneration in the laboratory are shown in Table VII.

TABLE VII

| | |
|---|---|
| Surface area, m$^2$/g | 89.2 |
| Pore volume, ml/g | 0.30 |
| Composition, weight % | |
| Silicon | 26.5 |
| Aluminum | 19.7 |
| Calcium | 0.037 |
| Sodium | 0.49 |
| Potassium | 0.076 |
| Lithium | 0.005 |
| Phosphorus | 0.09 |
| Cerium | 0.60 |
| Nickel | 0.038 |
| Vanadium | 0.11 |
| Iron | 0.62 |
| Titanium | 0.77 |
| Carbon | 0.17 |

The used commercial cracking catalyst having the properties shown in Table VII was then subjected to regeneration in the laboratory by heating the catalyst while fluidized with air to 1200° F. (649° C.) and maintaining it at that temperature for about 1 hour while fluidized with air. The catalyst was then cooled to room temperature (about 25° C.) while fluidized with nitrogen, and the resulting regenerated catalyst, herein designated as catalyst Y, was employed as shown below.

Portions of catalyst Y were used in the preparation of catalyst compositions containing, per 100 parts by weight catalyst Y, 0.01 part by weight antimony and 0.001 part by weight tin, and 0.02 part by weight antimony and 0.002 part by weight tin. The composition of lower antimony and tin concentration was prepared by adding, with stirring, to catalyst Y two cyclohexane solutions, one of which contained the calculated amount of dibutyltin bis(isooctymercaptoacetate) and the other of which contained the calculated amount of a mineral oil solution of antimony tris(O,O-dipropyl phosphorodithioate) containing 10.9 weight percent antimony, after which the resulting mixture was taken to apparent dryness on a hot plate. The composition of higher antimony and tin concentration was prepared by stirring with catalyst Y a cyclohexane solution of the calculated amount of dibutyltin bis(isooctyl mercaptoacetate), drying the mixture on a hot plate, stirring the resulting dried mixture with a cyclohexane solution containing the calculated amount of a mineral oil solution of antimony tris(O,O-dipropyl phosphorodithioate) containing 10.9 weight percent antimony, and taking the resulting mixture to apparent dryness on a hot plate.

Other portions of catalyst Y were used in the preparation of catalyst compositions containing 0.002 and 0.011 parts by weight tin per 100 parts by weight catalyst Y. In each of these two preparations a solution of the calculated amount of dibutyltin bis(isooctyl mercaptoacetate) in cyclohexane or toluene was stirred with catalyst Y, and the resulting mixture was taken to apparent dryness on a hot plate.

Yet other portions of catalyst Y were used in the preparation of catalyst compositions containing 0.011 and 0.02 parts by weight antimony per 100 parts by weight catalyst Y. In each of these two preparations the calculated amount of a mineral oil solution of antimony tris(O,O-dipropyl phosphorodithioate) containing 10.9 weight percent antimony, in cyclohexane, was stirred with catalyst Y, and the resulting mixture was taken to apparent dryness on a hot plate.

Each of the six catalyst compositions above was conditioned in the following manner. The catalyst was placed in a laboratory-sized, confined fluid bed, quartz reactor and heated from room temperature (about 25° C.) to 900° F. (482° C.) while fluidized with nitrogen, then heated from 900° F. (482° C.) to 1200° F. (649° C.) while fluidized with hydrogen. While maintained at about 1200° F. (649° C.), the catalyst was then fluidized with nitrogen for 5 minutes, followed by fluidization with air for 15 minutes. In one instance, the catalyst was again fluidized with nitrogen for 5 minutes while maintained at 1200° F. (649° C.). The catalyst was then aged through 10 cycles, each cycle being conducted in the following manner. The catalyst was cooled to about 900° F. (482° C.) during 0.5-1 minute, while fluidized with air, then fluidized with nitrogen while maintained at approximately 900° F. (482° C.) for about 1 minute, then heated to 1200° F. (649° C.) during 2 minutes while fluidized with nitrogen and hydrogen, then maintained at 1200° F. (649° C.) for 1 minute while fluidized with nitrogen, and then maintained at 1200° F. (649° C.) for 10 minutes while fluidized with air. After these 10 aging cycles the catalyst was cooled to room temperature (about 25° C.) while fluidized with nitrogen.

The six aged catalysts prepared as described above and catalyst Y were evaluated in seven series of cracking-regeneration cycles, in which the cracking step was conducted over a range of catalyst:oil ratios, using about 35–37 g of catalyst as a confined fluid bed in a quartz reactor and employing as the feedstock in the cracking step a blend consisting of 68.12 parts by weight gas oil, 11.98 parts by weight heavy cycle oil, and 19.87 parts by weight slurry oil. In each cycle the cracking step was carried out at 950° F. (510° C.) and about atmospheric pressure for 0.5 minute, and the regeneration step was conducted at 1200° F. (649° C.) and about atmospheric pressure for approximately 30 minutes using fludizing air, the reactor being purged with nitrogen before and after each cracking step.

The feedstock blend used in the cracking step had an API gravity at 60° F. (16° C.), determined as shown in Table II, of 25.4. The values for API gravity at 60° F. (16° C.), determined by the same method, for the gas oil component, the heavy cycle oil component, and the slurry oil component of the feedstock blend were 27.3, 17.5, and 2.2, respectively. Analysis of the gas oil component showed it contained 0.99 weight percent sulfur and 0.133 weight percent nitrogen.

Figure 8:
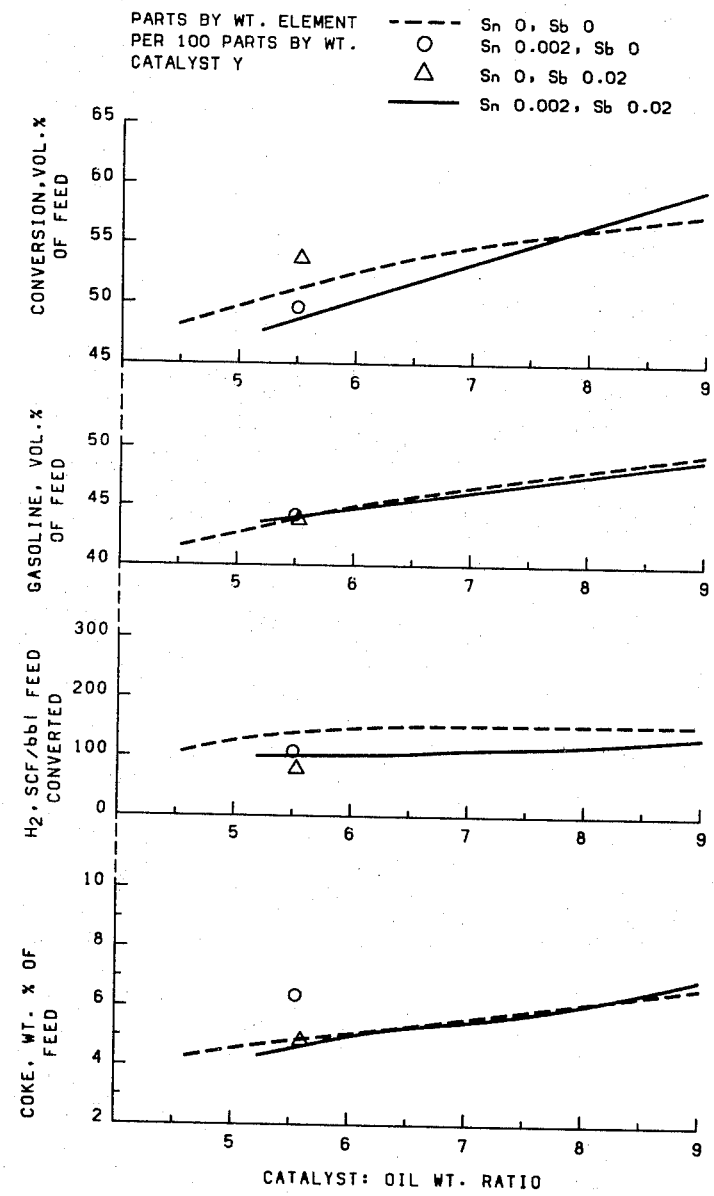
Figure 9:
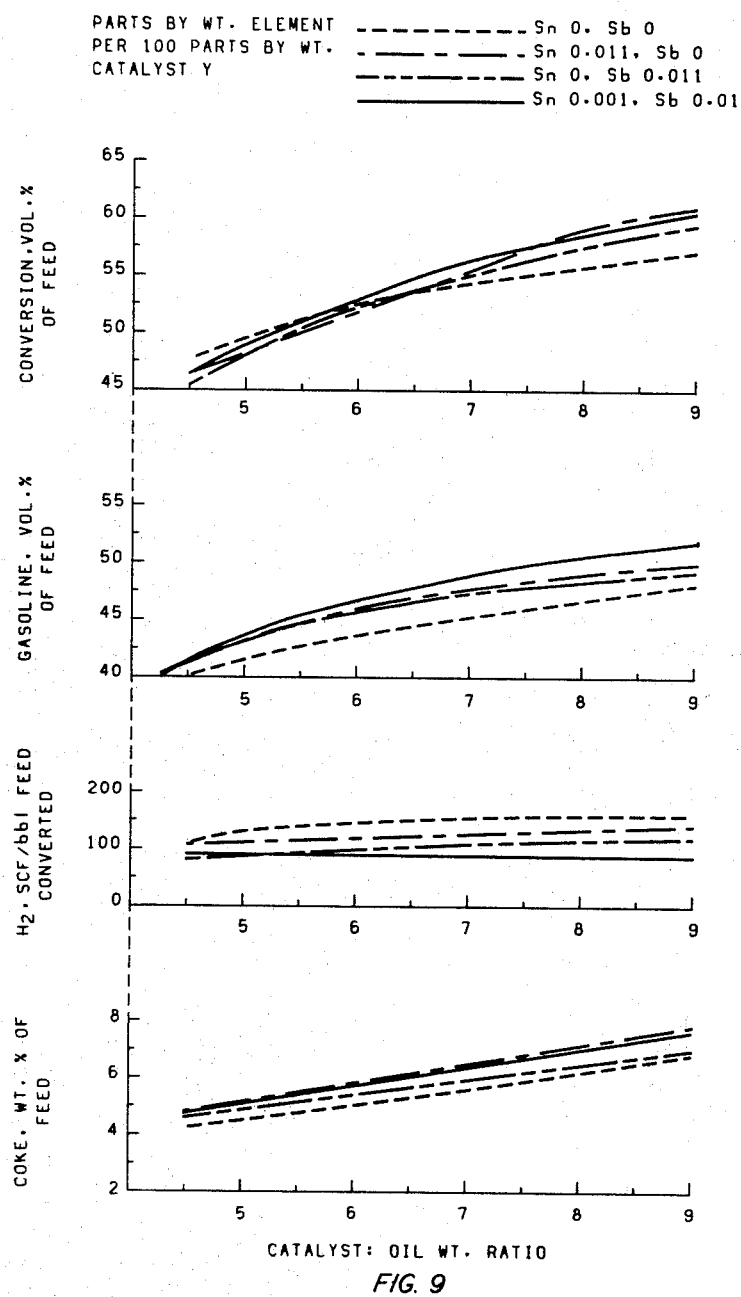

Results of cracking tests conducted at various catalyst:oil ratios are summarized in Table VIII. All cracking tests carried out with a given catalyst are included except those which gave results which obviously were in error because of equipment malfunction or human error. Specifically, tests having a material balance outside of 100±5% were omitted. Tests with a given catalyst were made in the order in which they are listed. In each instance in which the catalyst was one which had been treated with tin, not more than 6 days elapsed between the time of preparation and conditioning of the catalyst and the time the first test was conducted, or between any two tests, including tests which were in error for the reasons noted above. FIGS. 8 and 9 show in graphical form comparisons of selected tests given in Table VIII, a series of at least five tests with a given catalyst composition at varying catalyst:oil ratios being curve-fitted to provide smooth curves as shown, and a pair of tests with a given catalyst composition at nearly constant catalyst:oil ratio being shown as single points, each of which represents the average of the values on which it is based.

TABLE VIII

| Cracking Test | Catalyst, Wt. % Element Added Sn[1] | Sb[2] | Catalyst:Oil Wt. Ratio | Conversion, Vol. % of Feed | Yield Coke, Wt. % of Feed | $H_2$, SCF/bbl Feed Converted | Gasoline, Vol. % of Feed |
|---|---|---|---|---|---|---|---|
| 1A | 0 | 0 | 7.01 | 54.0 | 5.5 | 163 | 44.9 |
| 2A | 0 | 0 | 6.07 | 52.7 | 4.7 | 156 | 45.0 |
| 3A | 0 | 0 | 4.98 | 47.8 | 5.0 | 140 | 42.0 |
| 4A | 0 | 0 | 9.02 | 57.6 | 7.0 | 159 | 49.9 |
| 5A | 0 | 0 | 5.07 | 51.7 | 4.8 | 112 | 44.4 |
| 6A | 0 | 0 | 4.55 | 48.2 | 4.4 | 113 | 41.7 |
| 1B | 0.002 | 0 | 5.49 | 48.7 | 6.2 | 107 | 42.9 |
| 2B | 0.002 | 0 | 5.51 | 50.4 | 6.6 | 111 | 46.6 |
| 1C | 0.011 | 0 | 5.50 | 48.4 | 5.1 | 102 | 43.4 |
| 2C | 0.011 | 0 | 5.50 | 47.1 | 5.3 | 126 | 43.0 |
| 3C | 0.011 | 0 | 4.50 | 44.7 | 5.2 | 100 | 39.4 |
| 4C | 0.011 | 0 | 5.00 | 51.6 | 4.6 | 123 | 44.6 |
| 5C | 0.011 | 0 | 6.24 | 52.0 | 5.5 | 148 | 47.0 |
| 6C | 0.011 | 0 | 5.00 | 48.9 | 5.9 | 135 | 43.5 |
| 7C | 0.011 | 0 | 6.97 | 56.1 | 6.5 | 170 | 47.4 |
| 8C | 0.011 | 0 | 7.98 | 61.0 | 7.8 | 111 | 46.1 |
| 9C | 0.011 | 0 | 8.98 | 61.1 | 7.6 | 135 | 50.3 |
| 10C | 0.011 | 0 | 4.51 | 47.4 | 4.5 | 113 | 41.6 |
| 1D | 0 | 0.011 | 5.50 | 51.2 | 5.0 | 84 | 45.6 |
| 2D | 0 | 0.011 | 8.03 | 56.6 | 6.4 | 120 | 50.3 |
| 3D | 0 | 0.011 | 7.01 | 52.8 | 5.8 | 127 | 45.3 |
| 4D | 0 | 0.011 | 6.24 | 55.3 | 5.1 | 125 | 46.9 |
| 5D | 0 | 0.011 | 5.00 | 45.8 | 4.9 | 96 | 41.8 |
| 6D | 0 | 0.011 | 4.50 | 45.7 | 4.4 | 79 | 39.6 |
| 7D | 0 | 0.011 | 5.00 | 48.6 | 5.3 | 80 | 44.1 |
| 8D | 0 | 0.011 | 8.99 | 59.8 | 7.1 | 111 | 50.0 |
| 9D | 0 | 0.011 | 7.00 | 54.8 | 6.0 | 94 | 44.1 |
| 10D | 0 | 0.011 | 5.49 | 49.5 | 5.3 | 82 | 46.0 |
| 11D | 0 | 0.011 | 6.22 | 55.4 | 5.5 | 80 | 47.6 |
| 1E | 0 | 0.02 | 5.58 | 52.2 | 5.0 | 88 | 43.2 |
| 2E | 0 | 0.02 | 5.46 | 54.4 | 4.6 | 73 | 45.1 |
| 1F | 0.001 | 0.01 | 5.53 | 54.3 | 5.2 | 131 | 48.6 |
| 2F | 0.001 | 0.01 | 5.48 | 47.9 | 4.0 | 103 | 43.8 |
| 3F | 0.001 | 0.01 | 8.02 | 58.4 | 7.3 | 80 | 51.2 |
| 4F | 0.001 | 0.01 | 7.02 | 58.7 | 5.3 | 107 | 51.6 |
| 5F | 0.001 | 0.01 | 8.98 | 58.6 | 7.7 | 75 | 49.5 |
| 6F | 0.001 | 0.01 | 6.24 | 56.7 | 6.7 | 82 | 46.0 |
| 7F | 0.001 | 0.01 | 5.00 | 47.7 | 5.1 | 73 | 44.6 |
| 8F | 0.001 | 0.01 | 5.00 | 49.5 | 4.9 | 95 | 45.6 |
| 9F | 0.001 | 0.01 | 5.49 | 50.9 | 6.2 | 64 | 43.1 |
| 10F | 0.001 | 0.01 | 6.01 | 52.2 | 5.9 | 61 | 46.2 |
| 11F | 0.001 | 0.01 | 4.48 | 46.0 | 5.2 | 78 | 39.3 |
| 1G | 0.002 | 0.02 | 6.99 | 53.6 | 4.9 | 123 | 43.8 |
| 2G | 0.002 | 0.02 | 5.49 | 48.2 | 4.7 | 103 | 44.6 |
| 3G | 0.002 | 0.02 | 6.23 | 50.5 | 5.4 | 104 | 46.6 |
| 4G | 0.002 | 0.02 | 8.03 | 57.1 | 7.2 | 158 | 47.7 |

TABLE VIII-continued

| Cracking Test | Catalyst, Wt. % Element Added Sn[1] | Catalyst, Wt. % Element Added Sb[2] | Catalyst:Oil Wt. Ratio | Conversion, Vol. % of Feed | Yield Coke, Wt. % of Feed | Yield $H_2$, SCF/bbl Feed Converted | Yield Gasoline, Vol. % of Feed |
|---|---|---|---|---|---|---|---|
| 5G | 0.002 | 0.02 | 9.02 | 59.4 | 6.5 | 115 | 50.0 |

[1] Based on weight of catalyst prior to addition of tin as dibutyltin bis(isooctyl mercaptoacetate) and prior to addition of antimony, if any.
[2] Based on weight of catalyst prior to addition of antimony as antimony tris(O,O-dipropyl phosphorodithioate) and prior to addition of tin, if any.

On the basis of the same reasoning applied in Example III, FIG. 8 shows that the catalyst containing 0.002 part by weight tin and 0.02 part by weight antimony per 100 parts by weight catalyst prior to treatment with the tin and antimony compounds produces a surprisingly low level of coke at a low catalyst:oil weight ratio, e.g., 5.5:1. Much more strikingly, FIG. 9 shows that the catalyst containing 0.001 part by weight tin and 0.01 part by weight antimony per 100 part by weight catalyst prior to treatment with the tin and antimony compounds produces a surprisingly high yield of gasoline at catalyst:oil weight ratios of about 5 to about 9, an unexpectedly high conversion of feed at intermediate catalyst:oil weight ratios, and a surprisingly low level of hydrogen at catalyst:oil weight ratios in the range of 6 to 9.

EXAMPLE V

This calculated example is given to indicate how the invention can be used on a plant scale in a presently preferred embodiment. In a commercial cracking unit containing 200 tons of cracking catalyst, 24,300 bbl/day of oil having an API gravity of 20.8 are cracked. To build up on the cracking catalyst levels of 0.15 weight percent antimony and 0.015 weight percent tin, based on untreated cracking catalyst, antimony tris(O,O-dipropyl phosphorodithioate) is added to the feedstock in an amount such as to provide 6 ppm antimony, and dibutyltin bis(isooctyl mercaptoacetate) is added to the feedstock in an amount such as to provide 0.6 ppm tin, each for 17 days. Alternatively, for 10 days to the feedstock are added antimony tris(O,O-dipropyl phosphorodithioate) in an amount such as to provide 9 ppm antimony and dibutyltin bis(isooctyl mercaptoacetate) in an amount such as to provide 0.9 ppm tin. To keep the antimony level at 0.15 weight percent and the tin level at 0.015 weight percent, addition of the antimony and tin compounds to the feedstock then has to be maintained at rates such as to provide a feedstock containing 3 ppm antimony and 0.3 ppm tin, if 8 tons of catalyst per day are withdrawn from the cracking reactor system and replaced by untreated catalyst. If only 6 tons of catalyst per day are replaced, this addition would be sufficient to keep the antimony and tin levels of the catalyst system at 0.195 weight percent and 0.0195 weight percent, respectively. This means that 652.5 pounds of a mineral oil solution of antimony tris(O,O-dipropyl phosphorodithioate), this solution having an antimony content of 11 weight percent, and 39.65 pounds of commercial dibutyltin bis(isooctyl mercaptoacetate) having a tin content of 18.1 weight percent have to be added, per day, to the feedstock for 10 days (435 pounds and 26.41 pounds, respectively, for 17 days) to achieve the specified levels of antimony and tin on the catalyst. In order to maintain these specified levels, 217.5 pounds of this mineral oil solution of antimony tris(O,O-dipropyl phosphorodithioate) and 13.26 pounds of the commercial dibutyltin bis(isooctyl mercaptoacetate) have to be added, per day to the feedstock.

Reasonable variations and modifications, which will be apparent to those skilled in the art, can be made in this invention without departing from the spirit and scope thereof.

We claim:

1. A process for cracking a hydrocarbon feedstock which comprises contacting said hydrocarbon feedstock with a zeolite-containing cracking catalyst under cracking conditions wherein said cracking catalyst has been modified with a modifying amount of a treating agent which comprises (A) at least one of elemental antimony and compounds of antimony and (B) at least one of elemental tin and compounds of tin.

2. A process according to claim 1 wherein said cracking catalyst contains each of (A) and (B) in an amount such as to provide each of antimony and tin in the range of from about 0.005 to about 8 weight percent, said percentage being based on the weight of untreated cracking catalyst.

3. A process according to claim 2 wherein the weight ratio of antimony to tin is in the range of from about 0.001:1 to about 1000:1.

4. A process according to claim 1 wherein said cracking catalyst is a used cracking catalyst.

5. A process according to claim 4 wherein said used cracking catalyst has a deactivating amount of one or more of the metals nickel, iron and vanadium deposited thereon.

6. A process according to claim 1 wherein said cracking catalyst is an unused cracking catalyst.

7. A process according to claim 1 wherein said cracking catalyst is a mixture of used and unused cracking catalyst.

8. A process in accordance with claim 1 wherein said cracking catalyst is contacted with said feedstock at a temperature in the range of about 427° C. to about 816° C.

9. A process in accordance with claim 1 wherein (A) and (B) are added to said hydrocarbon feedstock.

10. A process in accordance with claim 1 wherein the total effective metals content of nickel, iron and vanadium in said hydrocarbon feedstock is in the range of 40 to 800 ppm.

11. A process in accordance with claim 1 wherein said hydrocarbon feedstock contains a detrimental amount of contaminating metals selected from the group consisting of nickel, iron and vanadium, wherein the modifying amount of the treating agent comprises at least about 0.0001 weight percent antimony and at least about 0.0001 weight percent tin, the weight percentages being based on the weight of said cracking catalyst prior to being contacted with (A) and (B).

12. A process in accordance with claim 1 wherein the amount of antimony in (A) is in the range of about 0.005 to about 2 weight percent, and the amount of tin in (B) is in the range of about 0.0005 to about 2 weight percent, the weight percentages being based on the weight of said cracking catalyst prior to being contacted with (A) and (B).

13. A process in accordance with claim 1 wherein the amount of antimony in (A) is in the range of about 0.01 to about 1 weight percent, and the amount of tin in (B) is in the range of about 0.001 to about 1 weight percent, the weight percentages being based on the weight of said cracking catalyst prior to being contacted with (A) and (B).

14. A process in accordance with claim 1 wherein the amount of antimony in (A) is in the range of about 0.05 to about 0.8 weight percent, and the amount of tin in (B) is in the range of about 0.001 to about 0.8 weight percent, the weight percentages being based on the weight of said cracking catalyst prior to being contacted with (A) and (B).

15. A process in accordance with claims 12, 13 or 14 wherein the weight ratio of antimony in (A) to tin in (B) is in the range of 0.001:1 to 1000:1.

16. A process in accordance with claims 12, 13 or 14 wherein the weight ratio of antimony in (A) to tin in (B) is in the range of 0.01:1 to 100:1.

17. A process in accordance with claims 12, 13 or 14 wherein the weight ratio of antimony in (A) to tin in (B) is in the range of 0.05:1 to 50:1.

18. A process in accordance with claims 12, 13 or 14 wherein the weight ratio of antimony in (A) to tin in (B) is in the range of 2:1 to 20:1.

19. A process in accordance with claims 12, 13 or 14 wherein the weight ratio of antimony in (A) to tin in (B) is in the range of 5:1 to 15:1.

20. A process in accordance with claim 17 wherein (A) comprises antimony tris(O,O-dipropyl phosphorodithioate) and wherein (B) comprises stannic O,O-dipropyl phosphorodithioate.

21. A process in accordance with claim 19 wherein (A) comprises antimony tris(O,O-dipropyl phosphorodithioate) and wherein (B) comprises dibutyltin oxide.

22. A process in accordance with claim 19 wherein (A) comprises antimony tris(O,O-dipropyl phosphorodithioate) and wherein (B) comprises dibutyltin bis(isooctyl mercaptoacetate).

23. A process for cracking a hydrocarbon feedstock containing a detrimental amount of contaminating metals selected from the group consisting of nickel, iron and vanadium, which comprises contacting said feedstock with a zeolite-containing cracking catalyst under cracking conditions in the presence of (A) at least one of elemental antimony and compounds of antimony and (B) at least one of elemental tin and compounds of tin, with the weight ratio of antimony in (A) to the tin in (B) being such as to provide a passivation of said contaminating metals greater than the sum of the passivation effects of each of (A) and (B) individually.

24. A process in accordance with claim 23 wherein each of (A) and (B) is present in an amount to provide at least about 0.0001 weight percent antimony and at least about 0.0001 weight percent tin, the weight percentages being based on the weight of said cracking catalyst without (A) and (B).

25. A process in accordance with claim 23 wherein the amount of antimony in (A) is in the range of about 0.005 to about 2 weight percent, and the amount of tin in (B) is in the range of about 0.0005 to about 2 weight percent, the weight percentages being based on the weight of said cracking catalyst without (A) and (B).

26. A process in accordance with claim 23 wherein the amount of antimony in (A) is in the range of about 0.01 to about 1 weight percent, and the amount of tin in (B) is in the range of about 0.001 to about 1 weight percent, the weight percentages being based on the weight of said cracking catalyst without (A) and (B).

27. A process in accordance with claim 23 wherein the amount of antimony in (A) is in the range of about 0.05 to about 0.8 weight percent, and the amount of tin in (B) is in the range of about 0.001 to about 0.8 weight percent, the weight percentages being based on the weight of said cracking catalyst without (A) and (B).

28. A process in accordance with claims 25, 26 or 27 wherein the weight ratio of antimony in (A) to tin in (B) is in the range of 0.01:1 to 100:1.

29. A process in accordance with claims 25, 26 or 27 wherein the weight ratio of antimony in (A) to tin in (B) is in the range of 0.05:1 to 50:1.

30. A process in accordance with claims 25, 26 or 27 wherein the weight ratio of antimony in (A) to tin in (B) is in the range of 2:1 to 20:1.

31. A process in accordance with claims 25, 26 or 27 wherein the weight ratio of antimony in (A) to tin in (B) is in the range of 5:1 to 15:1.

32. A process in accordance with claim 31 wherein said compound of antimony is at least one of the group consisting of antimony oxides, antimony sulfides, antimony selenides, antimony tellurides, antimony sulfates, antimonic acids, antimony halides, antimonyl halides, antimonides, antimony carboxylates, antimony thiocarboxylates, antimony thiocarbonates, antimony carbonates, trihydrocarbylantimony compounds, trihydrocarbylantimony oxides, antimony salts of phenolic compounds, antimony sulfonates, antimony carbamates, antimony thiocarbamates, antimony phosphites, antimony phosphates and antimony thiophosphates, and said compound of tin is at least one of the group consisting of tin oxides, tin sulfides, tin selenides, tin tellurides, tin sulfates, stannic acids, tin halides, tin oxyhalides, tin carboxylates, tin thiocarboxylates, tin thiocarbonates, tin carbonates, tetrahydrocarbyltin compounds, dihydrocarbyltin oxides, dihydrocarbyltin bis(hydrocarbyl mercaptide)s, tin salts of phenolic compounds, tin salts of thiophenolic compounds, tin sulfonates, tin carbamates, tin thiocarbamates, tin phosphites, tin phosphates, tin thiophosphates and dihydrocarbyltin bis-(O,O-dihydrocarbyl thiophosphate)s.

33. In the process of cracking a hydrocarbon feedstock containing a detrimental amount of contaminating metals selected from the group consisting of nickel, iron and vanadium, wherein the feedstock is contacted with an unmodified zeolite-containing cracking catalyst under cracking conditions; the improvement comprising contacting said unmodified cracking catalyst with (A) an amount of at least one of antimony and compounds of antimony sufficient to provide at least one improvement over said unmodified cracking catalyst selected from the group consisting of an increase in catalyst activity, an increase in yield of liquid fuels, a reduction in the production of coke, and a reduction in the production of hydrogen, and (B) an amount of at least one of tin and compounds of tin sufficient to provide an enhancement in said at least one improvement which is greater than the same amount of said at least one of tin and compounds of tin would provide over said unmodified cracking catalyst in the absence of antimony and compounds of antimony.

34. A process in accordance with claim 33 wherein each of (A) and (B) is added to said cracking catalyst in an amount to provide at least about 0.001 weight percent antimony and at least about 0.0001 weight percent tin, the weight percentages being based on the weight of said cracking catalyst prior to being contacted with (A) and (B).

35. A process in accordance with claim 33 wherein the amount of antimony in (A) is in the range of about 0.005 to about 2 weight percent, and the amount of tin in (B) is in the range of about 0.0005 to about 2 weight percent, the weight percentages being based on the weight of said cracking catalyst prior to being contacted with (A) and (B).

36. A process in accordance with claim 33 wherein the amount of antimony in (A) is in the range of about 0.01 to about 1 weight percent, and the amount of tin in (B) is in the range of about 0.001 to about 1 weight percent, the weight percentages being based on the weight of said cracking catalyst prior to being contacted with (A) and (B).

37. A process in accordance with claim 33 wherein the amount of antimony in (A) is in the range of about 0.05 to about 0.8 weight percent, and the amount of tin in (B) is in the range of about 0.001 to about 0.8 weight percent, the weight percentages being based on the weight of said cracking catalyst prior to being contacted with (A) and (B).

38. A process in accordance with claims 35, 36 or 37 wherein the weight ratio of antimony in (A) to tin in (B) is in the range of 0.01:1 to 100:1.

39. A process in accordance with claims 35, 36 or 37 wherein the weight ratio of antimony in (A) to tin in (B) is in the range of 2:1 to 20:1.

40. A process in accordance with claims 35, 36 or 37 wherein the weight ratio of antimony in (A) to tin in (B) is in the range of 5:1 to 15:1.

41. A process in accordance with claims 35, 36 or 37 wherein the weight ratio of antimony in (A) to tin in (B) is in the range of 0.05:1 to 50:1.

42. A process in accordance with claim 41 wherein (A) comprises antimony tris(O,O-dipropyl phosphorodithioate) and wherein (B) comprises dibutyltin oxide.

43. A process in accordance with claim 41 wherein (A) comprises antimony tris(O,O-dipropyl phosphorodithioate) and wherein (B) comprises dibutyltin bis(isooctyl mercaptoacetate).

44. A process in accordance with claim 33 wherein (A) and (B) are added to the feedstock before the feedstock is contacted with said cracking catalyst.

45. A process in accordance with claim 33 wherein said unmodified cracking catalyst is contacted with (A) and (B) and the thus modified catalyst composition is then contacted by said feedstock.

46. In a cracking process comprising
(a) introducing a hydrocarbon feedstock stream into a cracking zone,
(b) contacting the hydrocarbon feedstock stream in said cracking zone with a zeolite-containing cracking catalysts under elevated temperature conditions to produce a cracked product,
(c) withdrawing said cracked product from said cracking zone,
(d) separating said cracked product from said catalyst,
(e) introducing said catalyst into a regeneration zone, and
(f) contacting said cracking catalyst in said regeneration zone with free oxygen-containing gas such as to burn off at least a portion of the coke deposited on said cracking catalyst and reintroducing the thus regenerated catalyst into the cracking zone, the improvement which comprises
contacting said cracking catalyst with a modifying amount of a treating agent which comprises (A) at least one of elemental antimony and compounds of antimony and (B) at least one of elemental tin and compounds of tin.

47. A process in accordance with claim 46 wherein said cracking catalyst is contacted with each of (A) and (B) in an amount such that there is added each of antimony and tin to said cracking catalyst in an amount in the range of from about 0.005 to about 8 weight percent, said percentage being based on the weight of the cracking catalyst prior to treatment with said treating agent.

48. A process in accordance with claim 47 wherein the weight ratio of antimony to tin is in the range of from 0.001:1 to 1000:1.

49. A process in accordance with claim 46 wherein said cracking catalyst is contacted with said (A) and (B) under elevated temperature conditions and under reducing conditions.

50. A process in accordance with claim 46 wherein said contacting of said cracking catalyst with said treating agent is effected by addition of said treating agent to said hydrocarbon feedstock.

51. A process in accordance with claim 50 wherein said treating agent is added to said feedstock by the separate addition of each of (A) and (B) to said feedstock.

52. A process in accordance with claim 46 wherein said feedstock is a heavy oil having a total effective metals content of nickel, iron, copper, cobalt and vanadium in the range of 40 to 800 ppm.

53. A process in accordance with claim 46 wherein said treating agent is admixed with said regenerated catalyst prior to introduction thereof into said cracking zone.

54. A process in accordance with claim 46 wherein said treating agent is deposited on unused cracking catalyst and the resulting composition is introduced into said regeneration zone.

55. A process in accordance with claim 46 wherein said antimony is derived from an antimony thiophosphate and said tin is derived from a dihydrocarbyltin oxide.

56. A process in accordance with claim 46 wherein said antimony is derived from antimony tris(O,O-dipropyl dithiophosphate) and said tin is derived from dibutyltin oxide.

57. A process in accordance with claim 46 wherein (A) comprises antimony tris(O,O-dipropyl phosphorodithioate) and wherein (B) comprises stannic O,O-dipropyl phosphorodithioate.

58. A process in accordance with claim 46 wherein said cracking catalyst is contacted with each of (A) and (B) in an amount to provide at least about 0.0001 weight percent antimony and at least about 0.0001 weight percent tin, the weight percentages being based on the weight of said cracking catalyst prior to being contacted with (A) and (B), the weight ratio of antimony in (A) to tin in (B) being in the range of 0.05:1 to 50:1.

59. A process in accordance with claim 58 wherein there is provided less than 0.8 weight percent antimony and less than 0.8 weight percent tin.

60. A process in accordance with claim 59 wherein said weight ratio is in the range of 2:1 to 20:1.

61. A process for the catalytic cracking of hydrocarbon oils in the presence of a zeolite-containing cracking catalyst and deactivating amounts of catalyst deactivating heavy metals wherein said cracking is conducted in the presence of a treating agent employed in an amount sufficient to counter the adverse effects of said heavy metals, said treating agent comprising (A) at least one antimony component selected from the group consisting of antimony and compounds of antimony and (B) at least one tin component selected from the group consisting of tin and compounds of tin.

62. A process according to claim 61 wherein said cracking catalyst comprises a crystalline aluminosilicate zeolite cracking catalyst.

63. A process according to claim 62 wherein at least one of said deactivating heavy metals are selected from the group consisting of nickel, iron, and vanadium.

64. A process according to claim 63 wherein said deactivating metals are present in the hydrocarbon oil feed and the total effective metals content of said contaminating heavy metals in said feed is in the range of about 40 to about 800 ppm.

65. A process according to claim 64 wherein said hydrocarbon oil feed contains 0.2 to 100 ppm nickel, 0.02 to 500 ppm vanadium, and 0.02 to 500 ppm iron.

66. A process according to claim 65 wherein said treating agent is combined with said cracking catalyst prior to the contacting of said cracking catalyst with said hydrocarbon oil feed.

67. A process according to claim 65 wherein said treating agent is included in said hydrocarbon oil feed.

68. A process according to claim 65 wherein each of (A) and (B) are added to the catalyst in an amount sufficient to provide at least 0.0001 weight percent antimony and at least 0.0001 weight percent tin, the weight percentages being based on the weight of said cracking catalyst prior to being contacted with said treating agent.

69. A process according to claim 68 wherein (A) is added to said catalyst in an amount sufficient to provide 0.005 to 8 weight percent antimony and (B) is added to said catalyst in an amount sufficient to provide 0.005 to 8 weight percent antimony.

70. A process according to claim 69 wherein (A) is added to said catalyst in an amount sufficient to supply 0.01 to 2 weight percent antimony and (B) is added in an amount sufficient to provide 0.01 to 2 weight percent tin.

71. A process according to claim 70 wherein the weight ratio of antimony to tin is at least 1/1.

72. A process according to claim 71 wherein the weight ratio of antimony to tin is about 10/1 and (A) is added to said catalyst in an amount sufficient to provide at least about 0.05 weight percent antimony.

73. A process according to claim 72 wherein said antimony is provided by an antimony tris(O,O-dihydrocarbylphosphorodithioate).

74. A process according to claim 73 wherein said tin is provided by at least one tin compound selected from the group consisting of dihydrocarbyltin oxides, dihydrocarbyltin bis (hydrocarbyl mercaptoalkanoate), tin O,O-dihydrocarbyl thiophosphate, and dihydrocarbyltin bis(O,O-dihydrocarbyl thiophosphate).

75. A process according to claim 74 wherein said antimony is provided by antimony (O,O-dipropyl phosphorodithioate).

76. A process according to claim 75 wherein said tin is provided by at least one tin compound selected from the group consisting of dibutyltin bis(isooctyl mercaptoacetate), dibutyl tin oxide, stannous (O,O-di-n-propylphosphorodithioate), and stannic (O,O-di-n-propylphosphorodithioate).

* * * * *